US007525287B2

(12) United States Patent
Miyashita et al.

(10) Patent No.: US 7,525,287 B2
(45) Date of Patent: Apr. 28, 2009

(54) BATTERY PACK FOR DRIVING ELECTRIC MOTOR OF COMPACT ENGINE STARTING DEVICE, ENGINE STARTING DEVICE DRIVEN BY THE BATTERY PACK, AND MANUAL WORKING MACHINE HAVING THE ENGINE STARTING DEVICE

(75) Inventors: Satoshi Miyashita, Saitama (JP); Ryou Ono, Saitama (JP); Takashi Oniwa, Saitama (JP); Hiroshi Hokari, Saitama (JP)

(73) Assignee: Husqvarna Zenoah Co., Ltd., Saitama (JP)

( * ) Notice: Subject to any disclaimer, the term of this patent is extended or adjusted under 35 U.S.C. 154(b) by 457 days.

(21) Appl. No.: 11/244,838

(22) Filed: Oct. 6, 2005

(65) Prior Publication Data
US 2006/0087280 A1    Apr. 27, 2006

(30) Foreign Application Priority Data
Oct. 8, 2004    (JP)    ............................. 2004-296677
Feb. 16, 2005    (JP)    ............................. 2005-039795

(51) Int. Cl.
*H02J 7/00*    (2006.01)
*F02N 17/00*    (2006.01)
*B60K 1/00*    (2006.01)
*H01M 10/42*    (2006.01)
*H01M 10/44*    (2006.01)
*H01M 6/46*    (2006.01)

(52) U.S. Cl. ....................... 320/134; 320/133; 320/135; 320/136; 123/179.1; 123/179.3; 123/179.4; 180/65.1; 180/65.2; 180/65.3; 180/65.4; 429/50; 429/51; 429/153

(58) Field of Classification Search ................. 320/134, 320/136, 133, 135; 123/179.1, 179.3, 179.4; 180/65.1–65.4; 429/50, 51, 153
See application file for complete search history.

(56) References Cited

U.S. PATENT DOCUMENTS 4,968,074 A  *  11/1990  Yamagishi et al. .......... 292/201

(Continued)

FOREIGN PATENT DOCUMENTS

EP    1332924 A1    8/2003

(Continued)

*Primary Examiner*—Akm E Ullah
*Assistant Examiner*—Jue Zhang
(74) *Attorney, Agent, or Firm*—Darby & Darby, P.C.

(57) ABSTRACT

This invention provides a battery pack for driving a compact electric motor of a compact engine starting device mounted on a working machine, comprising lithium-based secondary battery comprising two cells, the entire discharge capacity of the cells being 500 to 2000 mAh, charging voltage per one cell being 3.0 to 4.2 V, various electronic circuits like driving and battery protection circuits of an electric motor, maximum discharge current of the battery having high rate of 10 to 60 A, the protection circuit including an overdischarge inhibit circuit (A) interposed in the electric motor driving circuit and automatically stopping the driving operation of the electric motor after time required for starting the engine elapsed, the volume of the battery pack being as extremely low as $2.5 \times 10^4$ to $1.0 \times 10^5$ mm$^3$, the tire required until the engine is started from the actuation of the electric motor being set to an interval as short as 5 to 15 seconds, since high current can flow.

12 Claims, 16 Drawing Sheets

U.S. PATENT DOCUMENTS

| | | | |
|---|---|---|---|
| 6,172,482 B1 * | 1/2001 | Eguchi | 320/134 |
| 6,184,658 B1 | 2/2001 | Mori et al. | |
| 6,608,470 B1 | 8/2003 | Oglesbee et al. | |
| 2002/0079865 A1 * | 6/2002 | Thomas et al. | 320/136 |
| 2002/0195895 A1 * | 12/2002 | Souki et al. | 310/112 |

FOREIGN PATENT DOCUMENTS

| | | |
|---|---|---|
| JP | 63-110672 | 7/1988 |
| JP | 2-13171 | 1/1990 |
| JP | 2573340 | 10/1996 |
| JP | 2002-285940 | 10/2002 |
| JP | 2003-120480 | 4/2003 |
| JP | 2003-339124 | 11/2003 |
| JP | 2006-077758 A | 3/2006 |

* cited by examiner

BATTERY PACK FOR DRIVING ELECTRIC MOTOR OF COMPACT ENGINE STARTING DEVICE, ENGINE STARTING DEVICE DRIVEN BY THE BATTERY PACK, AND MANUAL WORKING MACHINE HAVING THE ENGINE STARTING DEVICE

BACKGROUND OF THE INVENTION

1. Field of the Invention

The present invention relates to a battery pack provided therein with a compact battery having large output which drives an ultra-compact electric motor for starting a compact engine mounted in a various working machine such as a carrying harvester, a chain saw, a lawnmower, a piggyback type harvester, a power spraying machine, an engine blower, a duster and a hedge trimmer, an engine starting device driven by a battery pack, and a manual working machine having the engine starting device.

2. Description of the Related Art

Currently, an engine starting device which starts a compact air-cooling type gasoline engine mounted in a manual working machine such as a widely used harvester and chain saw mostly includes a recoil type driving portion, a follower portion connected to a crankshaft of the engine through connecting/disconnecting means such as a centrifugal clutch, and a shock absorption•power accumulating portion which is disposed between the driving portion and the follower portion and which shock-absorbing driving force of the driving portion and which includes a spiral spring for resiliently accumulate force between the follower portion and the shock absorption•power accumulating portion. The recoil type driving portion includes a recoil reel around which a recoil rope is wound, and a recoil spiral spring which is disposed between the recoil reel and the casing. Inner and outer ends of the recoil spiral spring are respectively fixed to the recoil reel and the casing. The recoil reel is rotated in one direction by manually pulling out the recoil rope and at the same time, the recoil spiral spring is wound up to accumulate a spring force and in this state, if an operator moves his or her hand off the recoil rope, the accumulated force of the recoil spiral spring is released, and the recoil rope is automatically wound back around the recoil reel.

The recoil type driving portion requires a pulling operation for pulling out the recoil rope whenever the engine is started. In this pulling operation of the recoil rope, it is usually necessary to pull the recoil rope quickly and largely. Thus, if an operator has a weak strength or is an old person, or if the working space is small, the engine cannot be started with one pulling operation in many cases. Hence, many proposals have been made to facilitate the start of an engine by pulling the recoil rope, and some of them become commercially practical, but complicated properties of the pulling operation itself still remain. Significant progress has been made in recent compact electric motor or battery, and although they are extremely reduced in size, they have large capacities. In recent years, attention has been paid for an electric engine starting device capable of easily starting the engine at the flick of a switch to avoid the troublesome operability of the recoil type starting device, and it is desired to develop such engine starting device.

Such an electric compact engine starting device is disclosed in Japanese Utility Model Laid-Open Publication No. 63-110672. The starting device includes a DC motor to which electricity is supplied from a battery and which is driven by the battery, a spiral spring having a spiral spring barrel which is driven and wound by a worm gear fixed to an output shaft of the motor, an output rotation shaft to which an inner end of the spiral spring is fixed, a rotation shaft of an engine connected to the output rotation shaft through a one-way clutch, a turn-lever which stops the rotation of the output rotation shaft or releases the stop, a ganged electric switch which is operated such that it enters only when the rotation stop of the output rotation shaft is released by the lever, and an armature current control circuit which is driven by a motor at the tire of switching operation of the electric switch. The armature current control circuit keeps rotation of the motor even when the rotation shaft of the motor exceeds a set rotation speed to wind the spiral spring, and when the winding up operation of the spiral spring is completed, if the rotation speed becomes lower than the set rotation speed, electricity supply is cut and the armature current control circuit stops the rotation of the motor.

Japanese Patent Laid-Open Publication No. 2002-285940 discloses a starter apparatus. According to the starter apparatus, shock absorption•force accumulating means is interposed in an intermediate portion of a power transmitting system between a driving portion and a follower portion. The driving portion is an electric motor as a driving source. A worm connected and fixed to an output rotation shaft of the electric motor and a worm wheel provided on an outer periphery of the spiral spring barrel constitute a speed reducing mechanism. This configuration is substantially the same as that of the Japanese Utility Model Laid-Open Publication No. 63-110672. A recoil type driving portion is added to the driving side in addition to the electric motor. The recoil type driving portion includes a rope reel around which a recoil rope is wound and which is rotated when the recoil rope is pulled, a recoil spiral spring which reversely rotates the rope reel to wind up the recoil rope, and a recoil ratchet mechanism for transmitting the rotation of the rope reel to the shock absorption•force accumulating means. The spiral spring barrel can rotate only in one direction by a one-way clutch. From this configuration, it can be said that the starter of the Japanese Patent Laid-Open Publication No. 2002-285940 is merely a combination of the Japanese Utility Model Laid-Open Publication No. 63-110672 and a known recoil mechanism.

Japanese Patent Publication No. 2573340 discloses a spiral spring type starting device having a single frame. Accommodated in the frame are a battery, a DC electric motor driven by electricity of the battery, a control apparatus for controlling the operation and the stop of the motor, a highly speed reduction ratio speed reducing mechanism for transmitting power of the motor, a spiral spring force accumulating apparatus which is driven by the highly speed reduction ratio speed reducing mechanism, and a power transmitting apparatus only for transmitting a force of the force accumulating apparatus to the crankshaft. The highly speed reduction ratio speed reducing mechanism includes a first planet gear type speed reducer which is driven by a DC electric motor disposed on the other axis which is in parallel to the crankshaft, and a second speed reducer in which a driving gear provided on an output shaft of the planet gear type speed reducer is meshed with a follower gear which is integrally formed on an outer periphery of the spring force accumulating chamber of the force accumulating apparatus.

According to Japanese Utility Model Laid-Open Publication No. 2-13171, a spiral spring barrel is pivotally supported through a support system of a planet gear speed reducer disposed on the opposite side of a crankshaft of an engine such that the spiral spring barrel can rotate in one direction. The spiral spring barrel is decelerated and rotated by the planet gear speed reducer connected through a speed reducing spur gear pair including a small gear and a large gear fixed to an output shaft of a DC electric motor disposed in a housing. The one-way rotation at that time is carried out by engagement between the ratchet pawl and teeth provided on the outer periphery of the spiral spring barrel. An actuating ratchet wheel and an actuating ratchet pawl are disposed on the spiral spring barrel on the side of the crankshaft. When the engagement is released, the ratchet wheel can rotate. A starter ratchet wheel is assembled to the actuating ratchet wheel. The starter ratchet wheel engages with a centrifugal clutch pawl provided on the crankshaft.

The spiral spring barrel is integrally formed at its outer periphery with a ratchet wheel. A ratchet wheel having a small diameter meshes with an upper end of the spiral spring barrel. The rotation shaft fixed to the ratchet wheel having the small diameter can be rotated from outside using a manual crank. The manual crank is not inserted during a normal operation of the engine, and the ratchet wheel having the small diameter idles. If the starting operation ends in failure and attempt is made to insert the spiral spring again, the manual crank is inserted into the rotation shaft of the ratchet wheel having the small diameter, the spiral spring barrel is rotated, and force is accumulated in the spiral spring. When the engine is to be started, the actuating ratchet is operated to release the energy accumulated in the spiral spring, thereby rotating the starter ratchet wheel to crank and start the engine.

The battery used as a power supply of a starting device of an engine disclosed in Japanese Utility Model Laid-Open Publication No. 63-110672, Japanese Patent Laid-Open Publication No. 2002-285940, Japanese Patent Publication No. 2573340 and Japanese Utility Model Laid-Open Publication No. 2-13171 is a battery so-called NiCad battery or nickel metal hydride battery, and an accommodation space of the battery is not specified as described above. However, such battery is disposed in the starting device in many cases as described in Japanese Patent Publication No. 2573340 and Japanese Utility Model Laid-Open Publication No. 2-13171, and if not, the entire capacity of the conventional battery is increased and thus, the battery is disposed in its special space in the vicinity of the starting device in many cases. Further, if electricity required for an electric motor, which winds up the spiral spring of the force accumulating apparatus disposed between the engine and the engine starting electric motor is to be obtained from a battery, many batteries called NiCad batteries or nickel metal hydride batteries are naturally required. Thus, there is a limit for reducing the starting device in size and weight.

According to the engine starting device of the Japanese Utility Model Laid-Open Publication No. 63-110672, the spiral spring barrel is rotated in one direction by the meshing state between the worm gear which is directly coupled to the electric motor and the worm wheel formed on the outer periphery of the spiral spring barrel. Therefore, the spiral spring barrel does not reversely rotate, but in a power transmitting mechanism using the meshing state between the worm gear and the worm wheel, the direction of the output shaft of the electric motor and the rotation driving shaft of the spiral spring barrel intersect with each other at right angles, the efficiency is poor (about 60%) and the device cannot be reduced in size in terms of design. According to the engine starting device of the Japanese Utility Model Laid-Open Publication No. 63-110672, when the battery goes dead or the electric motor is broken, the engine starting device itself cannot be operated.

According to the Japanese Patent Laid-Open Publication No. 2002-285940, the spiral spring barrel is manually driven at the time of emergency by the recoil type drive mechanism, the entire apparatus corresponds to an apparatus in which the speed reducing mechanism is added to the conventional recoil type engine starting device as the electric motor, and since the speed reducing mechanism includes the worm and the worm wheel of the spiral spring barrel, the shaft of the electric motor and the support shaft of the spiral spring barrel is needed to intersect with each other at right angles, and it is difficult to reduce the entire apparatus in size.

According to the Japanese Patent Publication No. 2573340, the highly speed reduction ratio speed reducing mechanism is disposed between the electric motor and the spiral spring barrel, the motor capacity and the battery capacity are reduced in size to 1/10 and 1/6 as compared with the self starter type battery, this is practical even if a storage battery is provided, but the speed reduction ratio is set extremely large as large as 1/250 to 1/300. Thus, it takes a long time until the spiral spring barrel is rotated to obtain a predetermined force in the spiral spring. Therefore, in this engine starting device, an automatic winding control apparatus for the spiral spring is disposed, force accumulating operation of the force accumulating spring is automatically carried out whenever the starting operation is carried out once by the control circuit of the control apparatus, the timer or the winding up operation of the spiral spring is detected, the electricity to the motor is stopped, thereby reducing the waiting time at the time of the restarting operation. Thus, the entire apparatus becomes complicated, and its cost is naturally increased.

According to the Japanese Utility Model Laid-Open Publication No. 2-13171, when the electric motor becomes in its inoperative state, the manual crank is operated to rotate the spiral spring barrel through the ratchet wheel having the small diameter, the spiral spring is wound again, force is accumulated in the spiral spring, the manual crank is removed and then, the actuating ratchet is operated, thereby releasing the energy accumulated in the spiral spring, the starter ratchet wheel is rotated and the engine is started. However, the ratchet wheel having the small diameter idles during the rotation of the engine. Further, since the shafts of the electric motor, the spiral spring barrel, the ratchet wheel having the small diameter and the ratchet pawl are disposed in parallel to each other, this prevents the compact design of the engine starting device.

The present applicant previously proposed an electric engine starting device in Japanese Patent Application No. 2004-232139 in which unnecessary members are eliminated, the engine starting device is ultimately reduced in size and weight under rational design, and an engine can be started manually at the time of emergency.

According to its basic configuration, the engine starting device includes a compact electric motor driven by a battery, a power accumulating portion in which power of the compact electric motor is transmitted in a power accumulating direction through a highly speed reducer mechanism, and a power transmitting portion for transmitting the accumulated force of the power accumulating portion to a crankshaft of the engine, the engine starting device further including a spring and a rotation support member which supports one end of the spring, a spiral spring or a coil spring can be used as the spring, when the spring is the spiral spring, the rotation support member includes the spiral spring barrel, and if the spring is the coil spring, a normal gear can be used.

The support member is formed with a first gear, a second gear is fixed to the output shaft of the highly speed reducer mechanism, the first and second gears mesh with each other, the engine starting device further includes rotation preventing means in which the power accumulating portion or the power transmitting portion is disposed, the power accumulating portion or the power transmitting portion is allowed to rotate in a accumulated force releasing direction in a normal state, but when the electric motor is in its inoperative state, the rotation in the accumulated force releasing direction is prevented, and the engine starting device further includes a rotation operating mechanism which is disposed on an axis of the output shaft of the highly speed reducer mechanism, which can be engaged with and disengaged from a shaft end of the output shaft, and which can rotate the output shaft manually. The highly speed reducer mechanism is a planet gear type speed reducing mechanism, the rotation axes of the power accumulating portion and the power transmitting portion are disposed on the same axis of the crankshaft, the rotation shafts of the compact electric motor and the highly speed reducer mechanism are disposed in parallel to the crankshaft, and spur gears are used as the first and second gears.

As described above, the mechanical problems of the compact engine starting devices discloses in Japanese Utility Model Laid-Open Publication No. 63-110672, Japanese Patent Laid-Open Publication No. 2002-285940, Japanese Patent Publication No. 2573340 and Japanese Utility Model Laid-Open Publication No. 2-13171 are solved by the Japanese Patent Application No. 2004-232139, but there still remains a problem concerning how the compact engine starting mechanism is smoothly, reliably and safely driven using the compact battery. That is, in order to reduce the entire working machine in size and weight, it is not only important to start the engine, but it is also important that the battery itself which drives an ignition circuit and a fuel supply control circuit of the engine has sufficient discharging capacity and the battery is reduced in size and weight.

In addition to the engine starting devices disclosed in the Japanese Utility Model Laid-Open Publication No. 63-110672, Japanese Patent Laid-Open Publication No. 2002-285940, Japanese Patent Publication No. 2573340 and Japanese Utility Model Laid-Open Publication No. 2-13171, as a power supply of a starting device of a working machine having this kind of compact engine, the NiCad battery or nickel metal hydride battery are widely used as described above. A standard compact battery has usually 1.2 V. In order to drive an engine starting compact electric motor, at least 7.2 V is required. Thus, the compact electric motor can be driven if six batteries are used theoretically. However, in order to start the engine ideally, several more batteries are required, but such batteries have too much volume to be accommodated in a switch box disposed at a steering wheel of the working machine, and naturally the batteries must be disposed in the starting device or other special location, and in order to reduce the batteries in size and weight, it exceeds a permissible range. Even if an alkaline battery or an oxirite battery (1.5 V) is used, internal impedance (internal resistance) is high, and at least six batteries are required for obtaining the output voltage.

Thus, it is an object of the present invention to provide a high performance compact and light and safe battery pack which can be applied to a compact engine starting device of a working machine and which has high output.

SUMMARY OF THE INVENTION

The object is effectively achieved by providing a battery pack for driving a compact electric motor of a compact engine starting device mounted on a working machine comprising a compact electric motor, a power accumulating portion in which power of the compact electric motor is transmitted in a power accumulating direction through a highly speed reducer mechanism, and a power transmitting portion for transmitting accumulated force of the power accumulating portion to a crankshaft of an engine, wherein the battery pack is provided therein with a lithium-based secondary battery comprising at least two cells, a normal self-discharge preventing circuit, an overcurrent preventing circuit and a protection circuit comprising an electronic circuit such as an overcharge preventing circuit, an overdischarge inhibit circuit and a start switch relay circuit, which are connected to the lithium-based secondary battery.

Preferably, the overdischarge inhibit circuit is a time circuit, and a continuous discharge time required for driving the engine starting electric motor is set such that the continuous discharge time is automatically stopped when 5 to 15 seconds elapsed.

Preferably, total discharging amount of the lithium-based secondary battery in the battery pack is 500 to 2000 mAh, and charging voltage per one cell is 3.0 to 4.2 V.

Preferably, maximum discharge current of the lithium-based secondary battery in the battery pack is set to 10 to 60 A, and discharge is automatically stopped when a predetermined continuous discharge time set in accordance with set maximum discharge current elapsed.

Preferably, the battery pack has a volume of $2.5 \times 10^4$ to $1.0 \times 10^5$ mm$^3$.

Preferably, the overcharge preventing circuit cuts a charge when a charging voltage per one cell exceeds 4.0 to 4.4 V.

Preferably, the battery pack further comprises an overheat preventing circuit in which the protection circuit detects internal temperature of the battery pack, and at a time when a rise of the detected temperature reaches a predetermined temperature irrespective of a set discharge time region of the overdischarge inhibit circuit, an electronic switch is automatically opened.

The starting device of a compact engine is provided therein with a compact electric motor driven by a lithium-based secondary battery of the battery pack, a power accumulating portion in which the power of the compact electric motor is transmitted in a power accumulating direction through a highly speed reducer mechanism, and a power transmitting portion for transmitting the accumulated force of the power accumulating portion to a crankshaft of the engine.

Preferably, the battery pack is integrally disposed in a switch box of a steering of the manual working machine.

Preferably, the compact electric motor has a housing volume of $4.0 \times 10^3$ to $8.0 \times 10^4$ mm$^3$, breakdown current of 1 to 100 A, and breakdown torque of 10 to 500 mNm.

Preferably, the starting device further comprises a carburetor having an automatic choke operated by a solenoid valve which is driven by the lithium-based secondary battery, and drive current of the solenoid valve is 200 to 800 mA.

In the manual working machine having the engine starting device, it is preferable that the engine comprises a power generator for charging the lithium secondary battery, the power generator comprises a magnet disposed on a rotation portion of the engine, and a power generating coil disposed on an opposed portion of the magnet.

Preferably, the rotation portion of the engine is a fan fixed to the crankshaft.

According to the present invention, in order to minimize the constituent equipment which is integrally formed on the starting device, a lithium-based secondary battery which can be most reduced in size which is much inferior to other dry batteries in terms of performance is employed as a battery. In the invention, the entire capacity as a power supply only need to have discharge capacity required for driving engine starting electric motor, driving the protection circuit of the battery, driving a solenoid valve of the carburetor having a later-described automatic choke, and for the electronic circuit.

In a preferred embodiment, the necessary discharge capacity is 1000 mAh. An output voltage of one cell is 3.8 V, if two cells are used, the voltage is 7.6 V, and even if the discharge current with respect to the electric motor for starting the engine is set to 10 to 60 A, this is sufficient capacity as a power supply for driving others. The lithium-based secondary battery of the invention which becomes a power supply of a compact engine starting device mounted on a working machine has sufficient capacity for starting the engine, its volume is extremely small, and even if the battery is incorporated in the starting device, the starting device can be compact incomparable with conventional technique.

As described above, the internal impedance of the lithium-based secondary battery is extremely low as low as 1/30 of conventional dry battery, and weight energy density and volume energy density are 2 to 3 times of those of the conventional dry battery, and this is suitable reducing the weight and size. A lithium-based ion secondary battery does not include environmentally harmful material, it does not have memory effect unlike NiCad battery, self-discharge is small, and necessary capacity is maintained for a long term. In this invention, safety is secured by various protection circuits, high output can be obtained and thus, it is preferable that the battery is a manganese lithium-based ion secondary battery.

In order to drive the engine starting electric motor with predetermined capacity and torque, it is necessary to enhance the rate of the battery itself more than the conventional battery in addition to reduce the battery in weight and size. By enhancing the rate, stable discharging operation with high current can be maintained for a long time. A rate value called high rate in this kind of lithium-based secondary battery is usually 3 to 5 C, but in this invention, a lithium-based secondary battery having the rate value of 26 C or higher which can discharge 26 A or higher with 1000 mAh discharge capacity is used.

As one of the breakdown torque protection circuits, this invention includes a special overdischarge inhibit circuit in which a discharge time required for driving the engine starting electric motor is set, and after this set time elapsed, the driving of the electric motor is automatically stopped. Since the overdischarge inhibit circuit is included, overheat of the electric motor driving circuit which has the greatest power consumption is prevented, and the battery life can be increased. The overdischarge inhibit circuit not only prevents the overheat of the electric motor driving circuit, but also suppress the overheat of elements disposed in various circuits, and burnout and ignition of various circuits can be prevented. In a preferred embodiment of the overdischarge inhibit circuit, a conventionally known so-called time circuit and electronic switch may be incorporated in the same circuit. According to the time circuit and electronic switch, time required for starting the engine after the electric motor is started is preset, and the electric motor is automatically stopped after the preset time elapsed.

Appropriate time region required for starting the engine after the electric motor is started is 5 to 15 seconds. In order to have a further reliably to prevent the overheating of the electric motor driving circuit, the overheat preventing circuit is provided. In the overheat preventing circuit, the temperature in the battery is detected, and in this time region of course, and even if in this time region, if the temperature rise exceeds 10° C., the electronic switch is closed. According to the overdischarge inhibit circuit, in addition to the above function, even when the electric motor is brought into a stall state in which the rotation thereof is stopped even when current is supplied due to any reason, since the discharge is stopped in the above time region, the electric motor is not seized up, and durability thereof is enhanced.

The volume of the battery pack employed in the invention is $5.5 \times 10^4$ to $1.0 \times 10^5$ mm$^3$, and the weight thereof is about 80 g, and the battery pack is extremely small and light. Since the battery pack is extremely small and light, the battery pack can be incorporated directly in a case of the engine starting device, but the battery pack can also be accommodated in the switch box of the steering wheel in the working machine for example. When the battery pack is accommodated in the switch box, since the battery pack is away from the engine, there are effects in terms of resistance to vibration and heat resistance, and since the battery pack is away from a gasoline tank, safety is secured, and the battery can easily be exchanged. The recoil type drive mechanism can be eliminated by the Japanese Patent Application No. 2004-232139, the outer size of the starting device can be reduced extremely, and its weight can also be reduced.

That is, the battery and the starting switch are not mounted in the starting device and are disposed in the switch box of the steering wheel of the working machine. A first axes of rotation support shafts of the power accumulating portion and the power transmitting portion of the engine starting device and second axes of the rotation shafts of the electric motor and the highly speed reducer mechanism are arranged in parallel to each other, and the first and second axes are disposed on the same plane. In this case, if the weight balance of the starting device is taken into consideration, the plane including the second axis and the first axis of the engine is a vertical surface. With this design, the size of the starting device in the axial direction can be reduced, the disposition space of the constituent equipment can be minimized, and the weight is brought into balance easily. Of course, since the number of devices is reduced, the weight is largely being reduced correspondingly.

When the planet gear type speed reducing mechanism is employed as the highly speed reducer mechanism, it is easy to reduce the mechanism in size, its speed reduction ratio is not as high as 1/250 to 1/300 as described in the Japanese Patent Laid-Open Publication No. 2002-285940 when the lithium-based secondary battery having high output is employed as the battery and the compact electric motor having high torque is employed, and sufficient effect can be obtained even if the speed reduction ratio is as low as about 1/50, and the starting time of the engine, i.e., time required until the power accumulating portion can accumulate predetermined force can largely be reduced.

When the battery pack includes electronic circuits such as the overcharge preventing circuit and the overcurrent preventing circuit in addition to the overdischarge inhibit circuit, the overheat of the battery caused by the overcharge is prevented, and ignition of the peripheral equipment caused by the overcurrent is prevented. The starting compact electric motor has capacity and torque sufficient for winding up the spiral spring which is a force accumulating apparatus because the speed reducing mechanism including the planet gears are interposed although the housing volume is as small as $4.0 \times 10^3$ to $8.0 \times 10^4$ mm$^3$. If a carburetor having an automatic choke is disposed, the starting electric motor is driven when the temperature of the engine is equal to or lower than a predetermined temperature, the solenoid valve is energized by the battery, the air/fuel ratio is changed, the fuel content is increased to an appropriate value.

If the engine of the working machine having the engine starting device of the above configuration and characteristics is provided, battery exhaustion is not caused, necessary discharge can always be carried out at the time of start of the engine, and the engine can smoothly start. When the lithium-based secondary battery employed in the invention is put on charge using the power generator, there is a tendency that the resistance in the battery is abruptly increased if the charging voltage exceeds 4.0 to 4.4 V, and the recovering ratio of the capacity is largely reduced. To prevent this, the battery pack is provided with a special overcharge preventing circuit, overcharge is prevented to increase the lifetime of the battery. If a rotation portion of the engine on which the magnet for the power generator is provided is a portion of a peripheral surface of a fan fixed to the crankshaft which always rotates together with the start of the engine, the power generation is started from the start of the engine, and it is only necessary to provide a coil, it is unnecessary to increase the conventional engine case itself in size. The effects which the present invention exerts are considerably great.

DESCRIPTION OF THE PREFERRED EMBODIMENTS

A representative embodiment of the present invention will be explained concretely with reference to the accompanying drawings.

Figure 1:
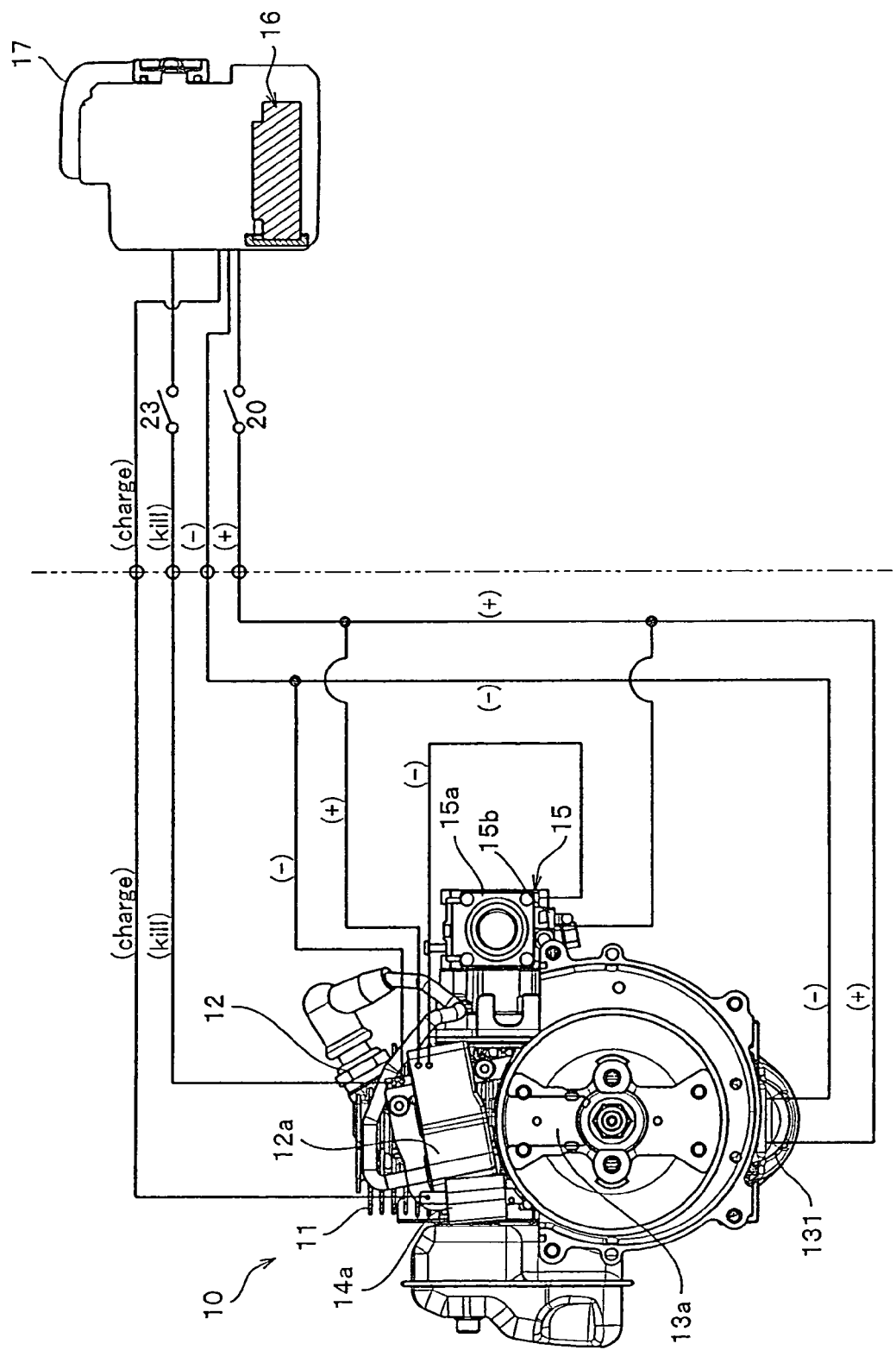
FIG. 1 is a wiring diagram between a compact engine starting device and a battery pack of the present invention.
Figure 2:
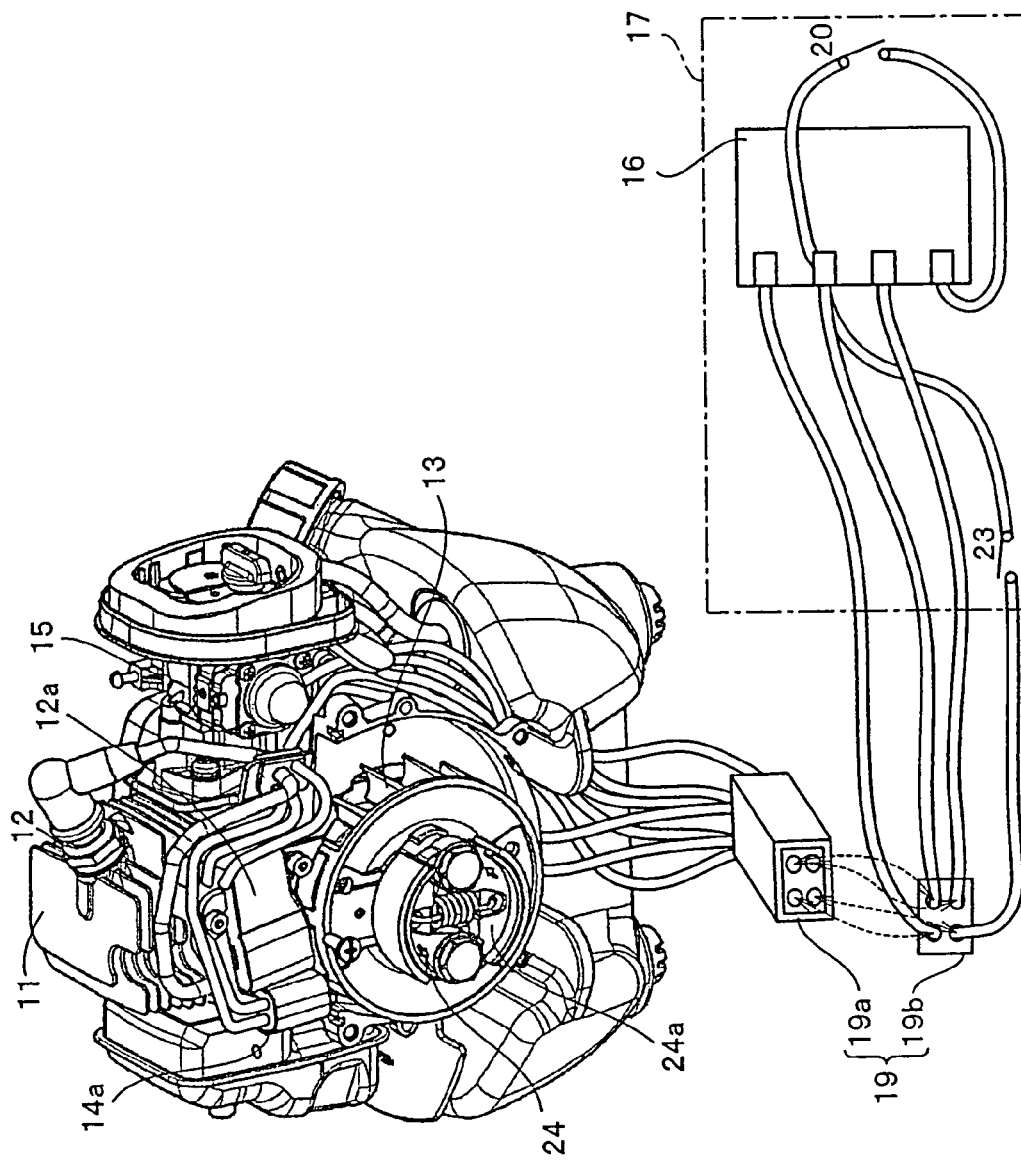
FIG. 2 is a stereograph schematically showing a concrete wiring example based on the connection circuit.

FIG. 1 is a diagram of a starting-circuit of a hybrid self-starter of a compact engine mounted in a working machine of the invention. FIG. 2 is a perspective view showing a concrete wiring between the compact engine and a battery accommodated in a switch box added to a steering wheel of the working machine.

Like the conventional engine shown in FIG. 2, the compact engine 10 of the embodiment includes a cylinder 11, a spark plug 12 facing a combustion chamber of the cylinder 11, a piston (not shown), a crankshaft (not shown), a fan 13 fixed to the crankshaft, and a centrifugal clutch (not shown) disposed on the back side (front side in FIG. 2) of the fan 13.

Figure 3:
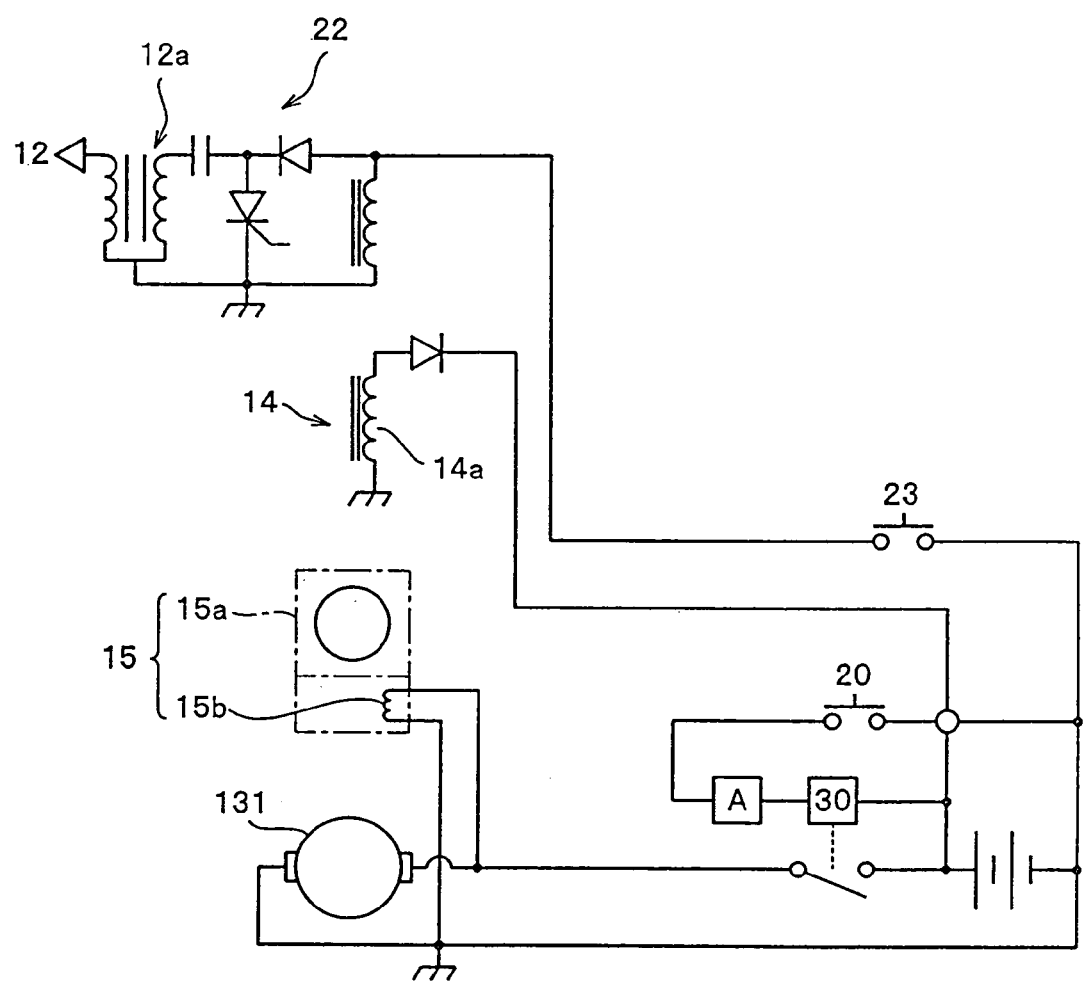
FIG. 3 is a circuit diagram between the compact engine starting device and the battery pack of the embodiment of the invention.

As shown in FIGS. 1 and 3, the compact engine 10 of the embodiment further includes, in addition to the above constituent members, a power generator 14 for charging a later-described battery which is a power supply for driving an engine starting electric motor 131, and a carburetor 15 having an automatic choke for adjusting an air/fuel ratio when the engine is to be started. The power generator 14 includes a first magnet 13a fixed to a portion of a peripheral surface of the fan 13, and a charging coil 14a opposed to a rotation surface of the magnet 13a. A solenoid valve (not shown) is mounted on the carburetor 15 having the automatic choke. The solenoid valve is not energized by the choke coil 15b when the engine is stopped, and is closed, but current flows from a battery pack 16 to the choke coil 15b at the same time when a starting switch is operated at the time of start of the engine to open the solenoid valve. The opening and closing amount of the solenoid valve controls the air/fuel ratio. According to the embodiment, a temperature sensor (not shown) is disposed in the vicinity of an explosion chamber of the engine, and the opening of the valve is controlled based on the detected temperature sensor.

In the invention, various electric or electronic devices disposed in the engine 10 such as the engine starting electric motor 131 are driven or operated by a single battery. In the invention, it is important to use a lithium-based secondary battery as the battery. The lithium-based secondary battery is small in size and weight as described above, the output voltage of a single compact cell is three or more times of a conventional NiCad battery, and even if the shallow charge and discharge are repeated like the self-starter system as in this invention, since there is no memory effect in which the capacity is reduced, even if the battery is left for a long term, the battery can smoothly start the engine. The lithium-based secondary battery has extremely small self-discharge amount as small as 1/5 of the NiCad battery, and especially the internal resistance is low as compared with other dry batteries including the NiCad battery. It is preferable that a manganese-based lithium ion battery having high safety and capable of discharging high output is employed.

In the embodiment, two cells of lithium based secondary batteries are used as one set. In the embodiment, the output voltage of one cell is about 4.2 V, discharge capacity is 1000 mAh, and its rate value is extremely high as high as 26 C. Further, the volume the battery pack 16 is as small as $2.5 \times 10^4$ mm$^3$, and its weight is only about 70 g. The compact electric motor 131 used in the embodiment has extremely small housing volume of $2.0 \times 10^4$ mm$^3$, and breakdown current is 1 to 100 A, and breakdown torque is as wide as 100 mNm. To drive the starting electric motor 131, power supply of about 7.6 to 8.0 V or higher is required. Thus, two cells are used as the batteries for starting engine. To obtain voltage of about 7.0 V using the NiCad battery of 1.2 V, at least six batteries are required. The battery of the embodiment includes a single packed battery including the lithium-based secondary battery having two cells and various electronic circuits. The electronic circuits include a later-described battery protection circuit, a battery charging circuit and various circuits for driving the engine. The rate of the lithium-based secondary battery is high. In this embodiment, the total discharge capacity is set to 1000 mAh, and the driving current of the starting electric motor 131 is set to 26 A.

The packed battery of the embodiment is extremely thin and thus, the battery pack 16 may be incorporated in a case of the starting device, but in this embodiment, the battery is detachably accommodated in the switch box 17 mounted on the steering wheel of the working machine as will be described later. Thus, as shown in FIG. 2, the various electric devices of the engine 10 and the battery pack 16 are connected through a plurality of lead wires connected to first and second connectors 19a and 19b of a connector 19. FIG. 3 shows the part of the connection circuit schematically.

In FIGS. 1 to 3, if a starting switch 20 is turned ON, electricity is discharged to the starting electric motor 131 through the overdischarge inhibit circuit A which is one of the battery protection circuits, and the engine starting electric motor 131 is driven. At the same time, when a temperature sensor (not shown) detects that the temperature around the explosion chamber of the engine is lower than a predetermined temperature, an air/fuel ratio control circuit is operated, current flows to the choke coil 15b of the carburetor 15 having the automatic choke, the solenoid valve (not shown) disposed in an intake passage of the carburetor 15a is opened, and the fuel supplied to the compact engine 10 is increased. When the temperature around the explosion chamber of the engine 10 exceeds the predetermined temperature, current which tries to flow to the choke coil 15b is shut off by a shut off circuit, and the solenoid valve is left closed. The drive current of the solenoid valve at that time is as low as 200 to 800 mA. The drive current is also sent from the battery pack 16.

Figure 4:
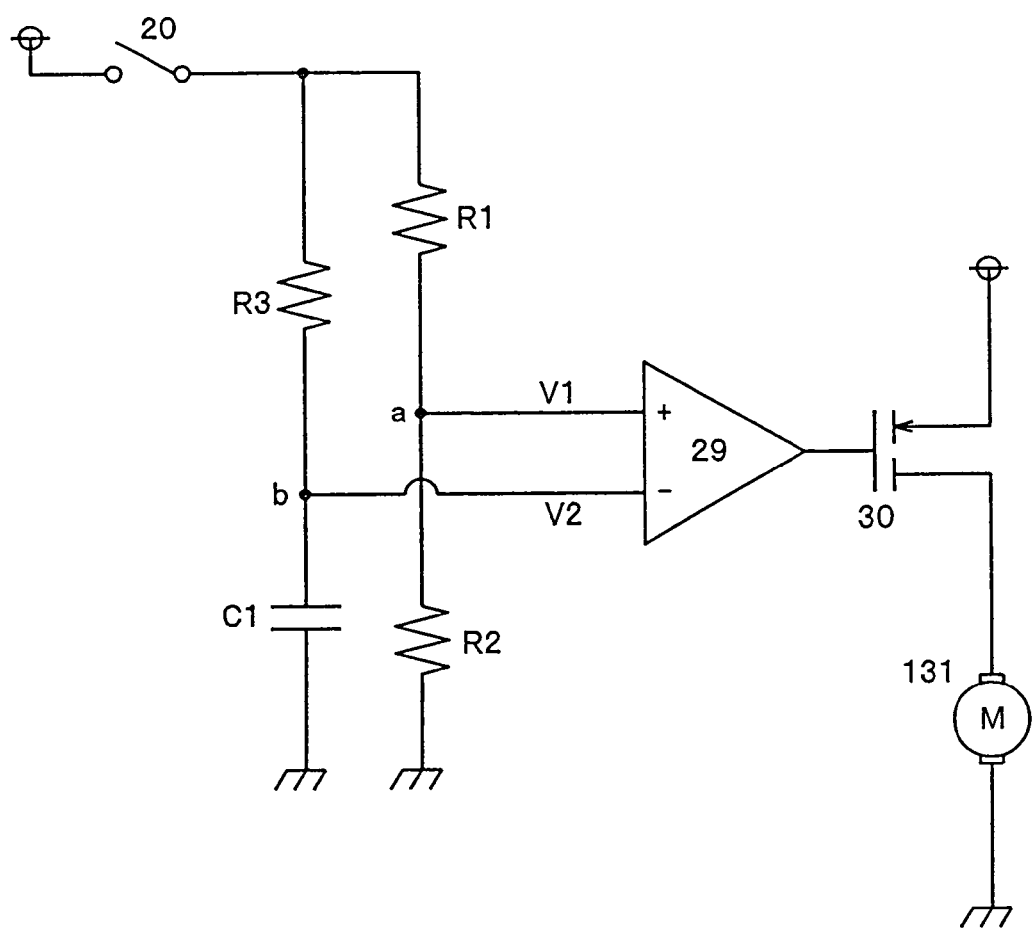
FIG. 4 is a circuit diagram showing a typical example of an overdischarge inhibit circuit which is one of protection circuits provided in the battery pack.

The overdischarge inhibit circuit A is one of the most characterized configurations of the present invention, and its basic functions are to previously set sufficient time required for reliably starting the compact engine 10 by driving the engine starting electric motor 131, to automatically shut down the driving circuit of the engine starting electric motor 131 when the preset time elapsed after the engine starting electric motor 131 is actuated, and to stop the operation of the engine starting electric motor 131. FIG. 4 shows one example of a typical time circuit using a capacitor constituting the overdischarge inhibit circuit A. Of course, this overdischarge inhibit circuit A is not limited to the time circuit shown in FIG. 4. Meanwhile, both the overdischarge inhibit circuit and the overheat preventing circuit can be disposed. The overheat preventing circuit detects the internal temperature of the battery pack 16 for example, automatically opens the circuit when the detected value exceeds a preset temperature to shut down the discharge, or integrates current value flowing through the starting electric motor 131 with respect to driving time, converts the value into an amount of heat, and automatically shuts down the discharge when the amount of heat exceeds a set value, or automatically shuts down the discharge when the number of revolutions of the motor exceeds a preset value.

In FIG. 4, if the starting switch 20 of the electric motor 131 is turned ON, voltage V1 is generated at a point a, and voltage V2 keeps rising while the capacitor C is charged at a point b. If the voltage V1 and the voltage V2 match with each other at that time, a signal is sent from an AND circuit 29, the closed electronic switch 30 is opened, and the operation of the electric motor 131 is stopped. The time T from the actuation to the stop of the electric motor 131 is determined by capacity of the capacitor C.

Figure 5:
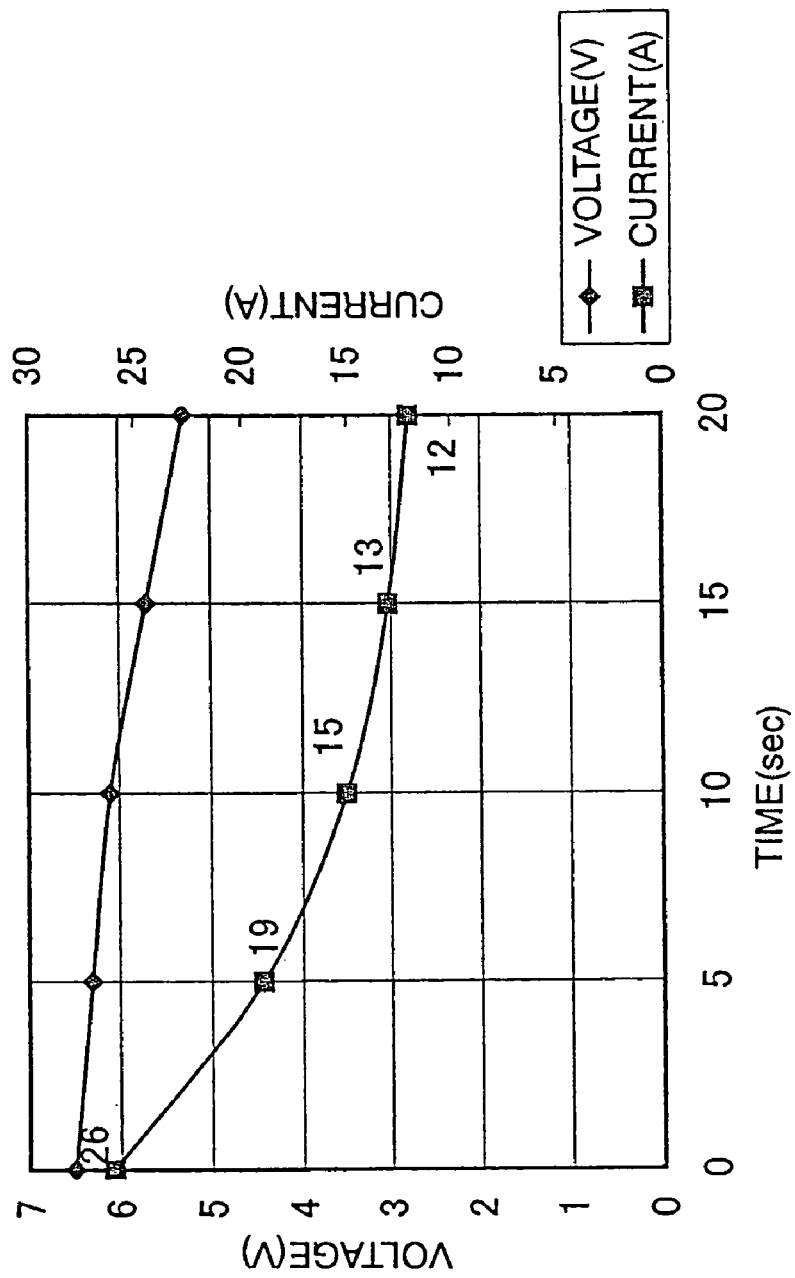
FIG. 5 is a diagram showing voltage-current characteristics at the time of stall of the motor.
Figure 6:
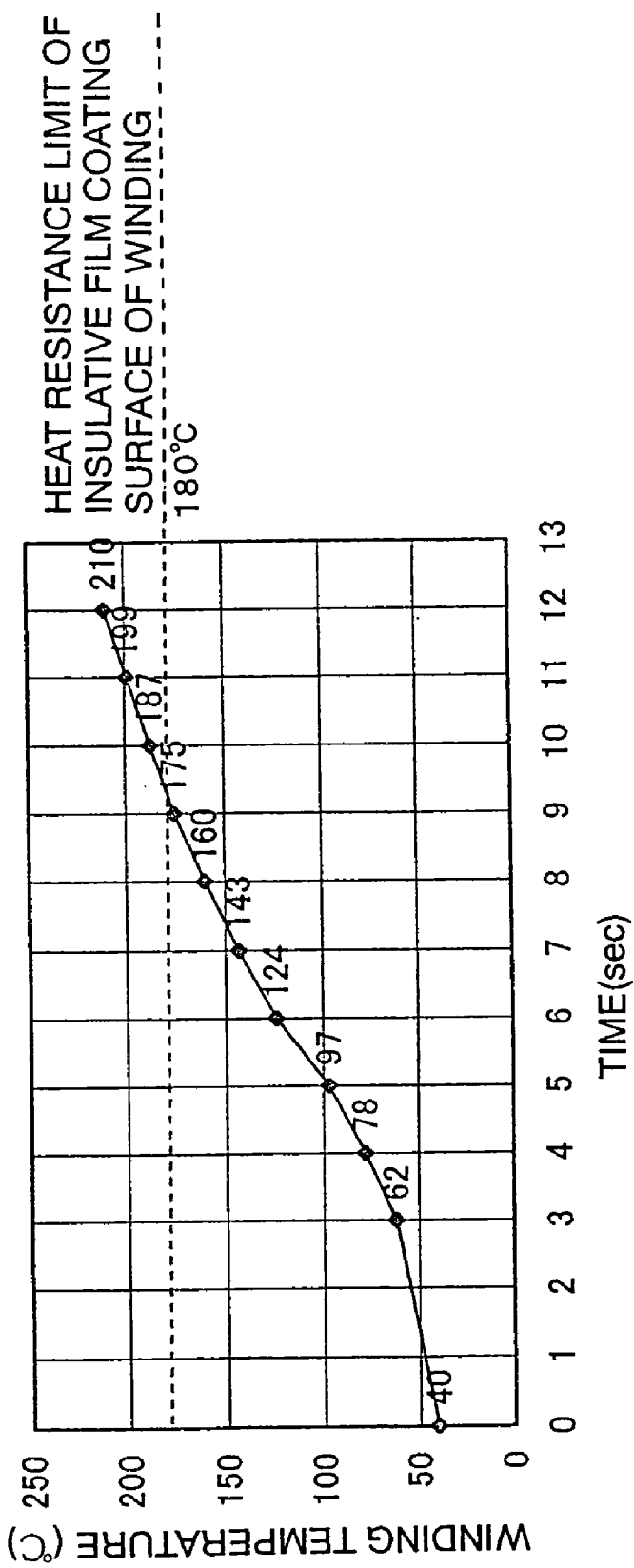
FIG. 6 is a diagram showing characteristics of one example of temperature characteristics of winding at the time of stall of the motor.

In the embodiment, the driving continuation time T of the electric motor 131 is set to 10 seconds. If the electric motor 131 is stalled and the starting switch 20 is turned ON and current of 26 A flows from the battery pack 16 to the motor driving circuit, the internal circuit of the battery pack 16 is overheated, and a portion of the circuit element is burned out and the circuit is destroyed. If the winding temperature exceeds a certain value, the electric motor 131 is also burned out and the motor does not rotate smoothly. FIGS. 5 and 6 show results of the experiment.

In a state in which the electric motor 131 is stalled, current of 26 A is allowed to flow through the electric motor 131 for 15 seconds by the fully charged (8.4 V) battery pack. As a result, as shown in FIG. 5, both the voltage and current are lowered with time. FIG. 6 shows variation of winding temperature when current flows through the electric motor 131 for 12 seconds under the same condition. Normally, in this kind of electric motor, the heat resistance limit of an insulative film coating a surface of the winding is 180° C. As can be understood from the drawings, the temperature rises to 187° C. for 10 seconds after current starts flowing, and the temperature becomes higher than the heat resistance limit of the insulative film.

Figure 7:
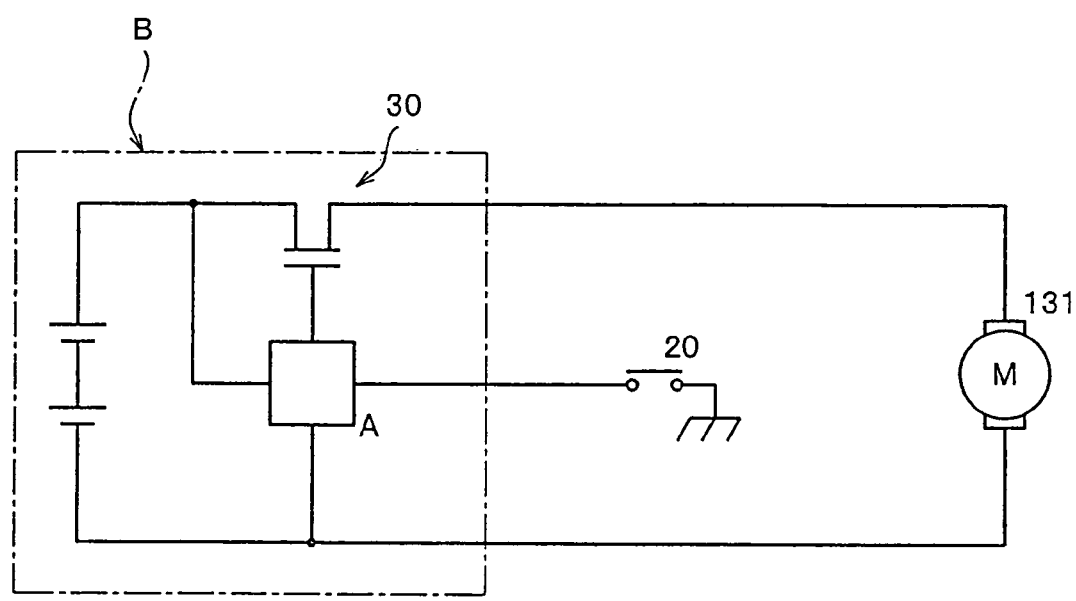
FIG. 7 is a circuit diagram showing one example of a relay circuit, which is one of the protection circuits provided in the battery pack of the invention.

In the embodiment, in addition to the overdischarge inhibit circuit and overheat preventing circuit, a relay circuit which is one of characterizing portion of the present invention is incorporated in the battery pack. FIG. 7 shows the relay circuit. The relay circuit of the invention protects the starting switch. The circuit is not of excitation type and includes a transistor circuit and is extremely small in size. When the relay circuit is not provided, if a battery having high rate which discharges large current of 30 A instantaneously as in this invention, current flows directly to the electric motor through the starting switch, metal portion of the starting switch 20 is burned and melted, the ON state of the switch is maintained, and the electric motor cannot be stopped in some cases.

As shown in FIG. 7, in the relay circuit of the embodiment, the resistance of a transistor 29 becomes infinite while the starting switch 20 is opened, current does not flow to the circuit, and the time circuit which is the overdischarge inhibit circuit A is not in its operative state. Of course, driving current does not flow to the electric motor M either. If the starting switch 20 is turned ON, current discharged from the battery is divided into large current on the side of the electric motor M and very small current on the side of the overdischarge inhibit circuit A through a transistor. At that time, current flowing to the overdischarge inhibit circuit A is extremely low and is about 5 mA, and remaining large current flows to the electric motor M. If the current flows, the capacitor C of the overdischarge inhibit circuit A starts charging at the same time, and if time determined by the capacity of the capacitor C elapsed, a signal is sent to a switching circuit (not shown), the switching circuit is opened to stop the discharge of the battery. in this embodiment, the discharge time is set to 5 to 10 seconds due to the later-described reason.

Figure 8:
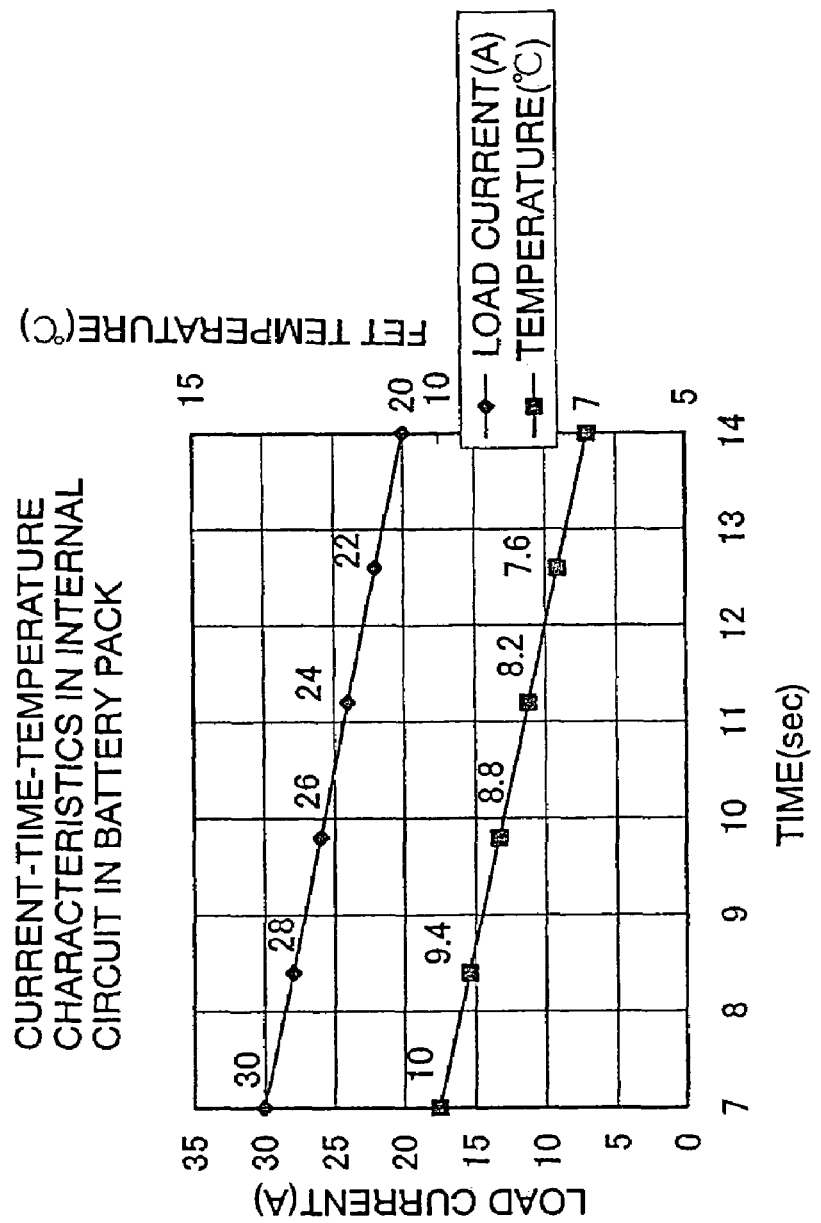
FIG. 8 is a diagram showing current-time-temperature characteristics in an internal circuit in the battery pack.

FIG. 8 and Table 1 show characteristics of current-time-temperature in a battery circuit when the various circuits were disposed and the same experiment was carried out. According to FIG. 8, it can be found that there is a straight correlation of the same gradient between the load current and the temperature in the battery circuit with time. According to the embodiment, since the discharge current immediately after the starting switch 20 is turned ON is 26 A, it can be estimated that the temperature rise at that time is 8.8° C. and time required until the temperature reaches the rise temperature is 9.8 seconds from FIG. 8.

TABLE 1

Battery: 7.4 V, 1000 mAh

| Time (sec) | Load current (A) | Temperature (° C.) |
|---|---|---|
| 14 | 20 | 7 |
| 12.6 | 22 | 7.6 |
| 11.2 | 24 | 8.2 |
| 9.8 | 26 | 8.8 |
| 8.4 | 28 | 9.4 |
| 7 | 30 | 10 |

In the working machine such as a carrying type harvester, the temperature in the vicinity of the battery box in direct sunlight in midsummer is about 60° C. in some cases, and the heat resistant upper limit is 70° C. Under such constraints, if the temperature rise of the battery circuit is suppressed to 8.8° C., 60° C.+8.8° C.=68.8° C., and it becomes lower than the heat resistant upper limit of 70° C. Thus, in the embodiment, the discharge time is set to 5 to 10 seconds. However, since the discharge time is different dependent on the capacity of the electric motor or the discharge capacity of the battery pack, the discharge time cannot be set to the constant value. In this invention, the discharge time is set to 5 to 15 seconds which does not give an operator abnormal feeling and which is the starting time of the engine while taking safety in consideration.

According to the embodiment, as the battery protection circuit incorporated in the battery pack 16, an overcharge preventing circuit B of the battery and an overcurrent preventing circuit (not shown) are incorporated in addition to the overdischarge inhibit circuit A. At the same time, a charging circuit (not shown) and an ignition circuit of the engine are also incorporated in the battery pack 16. Since the overcharge preventing circuit B, the charging circuit (not shown) and the ignition circuit of the engine are known circuits, detailed explanation thereof will be omitted here. The overcurrent preventing circuit is not illustrated in the drawing, but the overcurrent preventing circuit is provided in an intermediate portion of a necessary wire among wires of the various circuits. In this embodiment, the upper limit current of shut down of the overcurrent preventing circuit is about 30 A.

Figure 11:
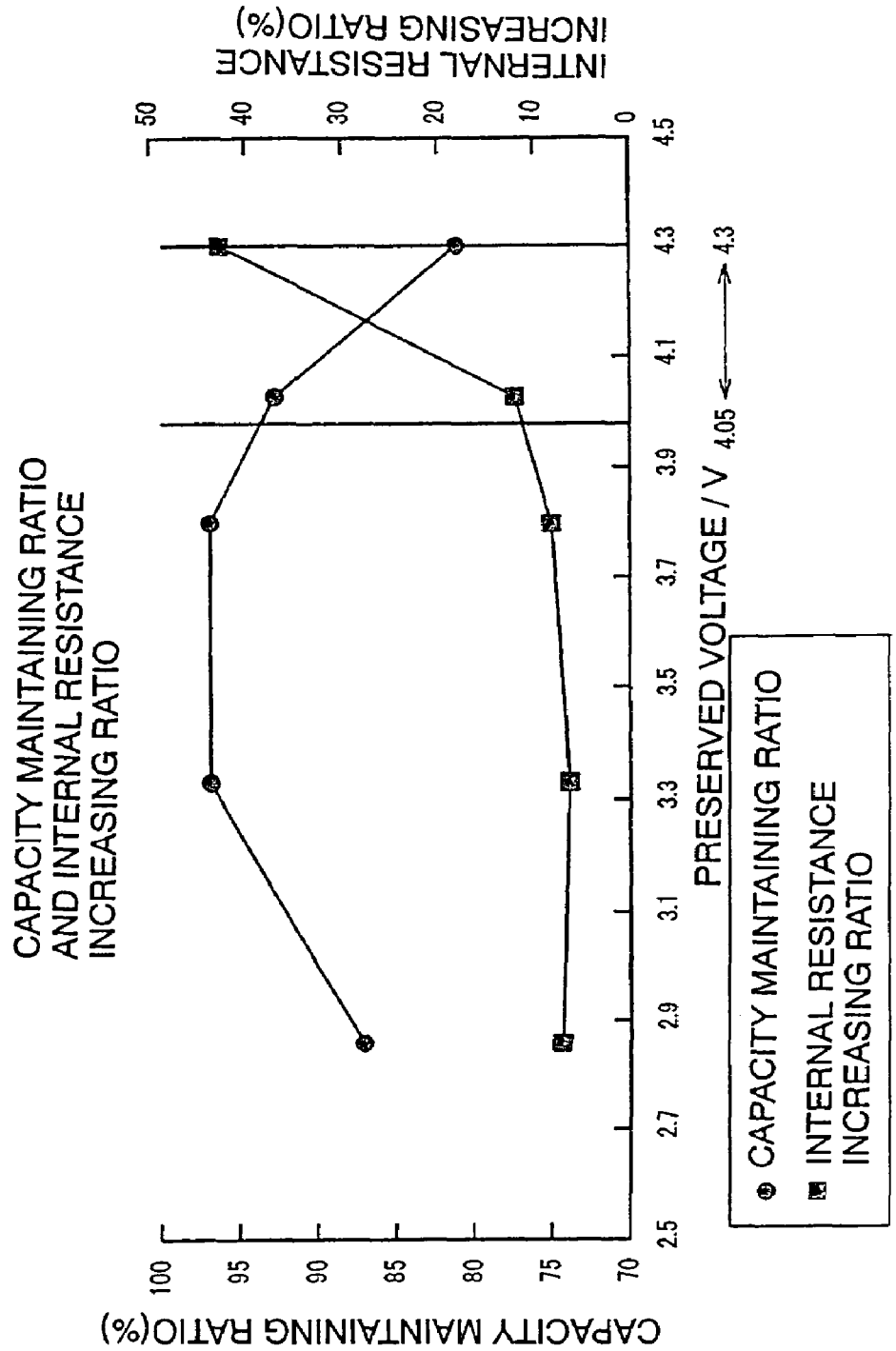
FIG. 11 is a diagram showing characteristics of capacity maintaining ratio and internal resistance increasing ratio of a lithium-based secondary battery.

White the engine is rotating, the power generator 14 keeps generating power through the overcharge preventing circuit B, its AC electricity is smoothened through a smoothing circuit, and is sent to the battery pack 16, thereby charging the battery pack 16. if the charging voltage at that time exceeds 4.1 V, the internal resistance rate of the lithium-based secondary battery abruptly increases as shown in FIG. 11, and the capacity recovering rate is abruptly lowered. Therefore, in this embodiment, it is adjusted by the overcharge preventing circuit incorporated in the battery pack, and the charging voltage of two cells is suppressed to about 8.1 V.

Figure 9:
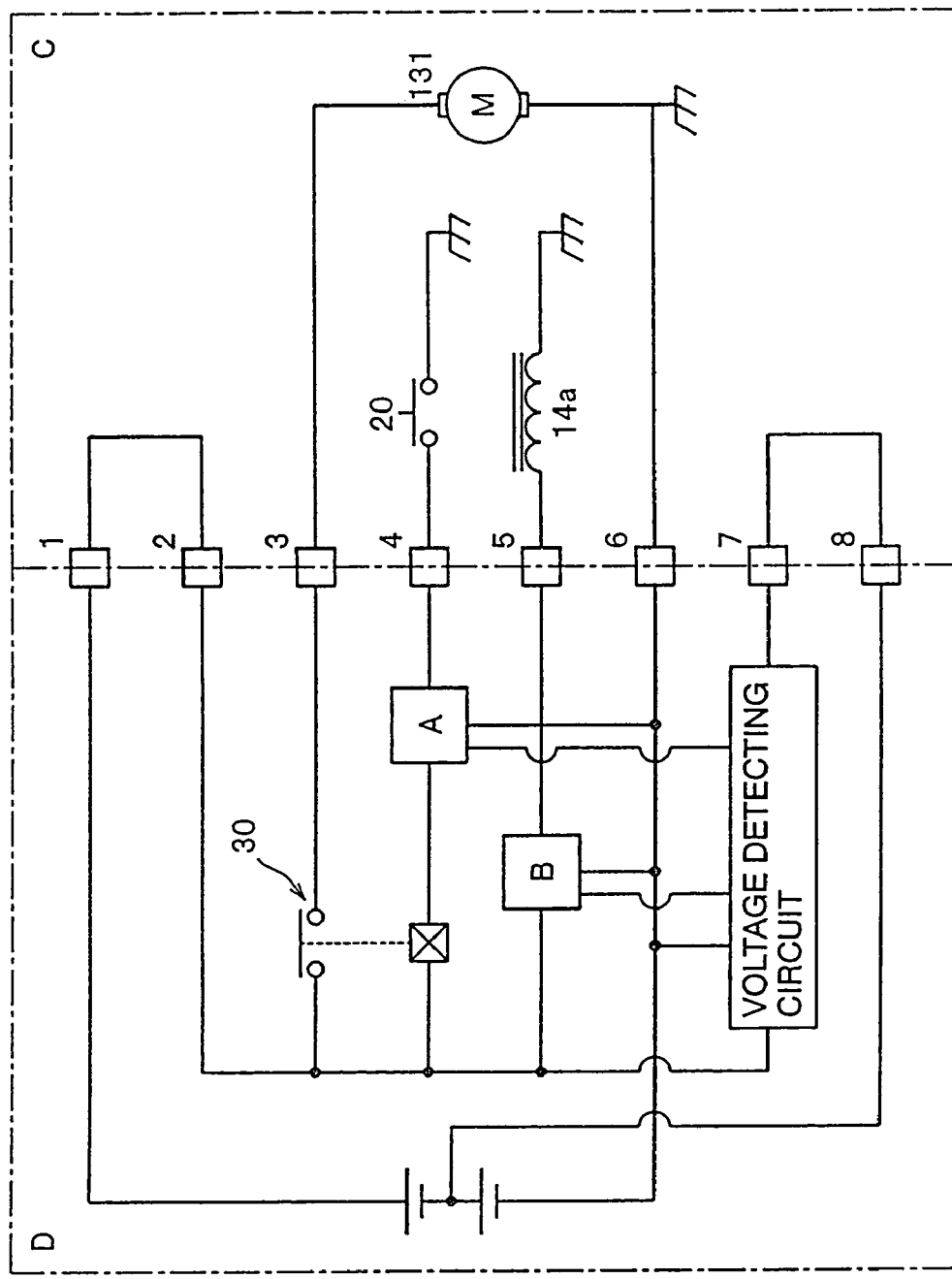
FIG. 9 is a view showing a shut-off mechanism of the internal circuit in the battery pack.

In another embodiment, when the working machine is not used or when the engine is stopped, improvement is made to prevent the discharge of the internal circuits of the battery pack 16 to enhance the lifetime of the battery. FIG. 9 is a block diagram of a circuit when the discharge of the internal circuits of the battery pack 16 is inhibited. This drawing is the entire block diagram when the overdischarge inhibit circuit A and the overcharge preventing circuit B of the internal circuits of the battery pack 16 are shown as representative circuits. In the drawing, the right side block C shown with phantom line shows an external wire, and the left block D shows an internal wire of the battery pack 16 of the invention.

As shown in the drawing, eight external wires on the side of the engine are connected to the first connector 19a, a terminal of the internal circuit exposed outside from the battery pack 16 is connected to the second connector 19b through eight external wires, and the first and second connectors 19a and 19b can be engaged with and disengaged from each other. In the illustrated example, the external wire and the battery pack 16 respectively have eight input and output terminals. Concerning the illustrated example, its concrete wiring will be described. The closed-circuit formed by the input and output terminals 1, 2, 7 and 8 is a circuit for avoiding the electric motor driving circuit of the battery pack 16 and the self-discharge of the protection circuit. The input and output terminals 3 to 6 are terminals for connecting the overcharge preventing circuit B and the electric motor driving circuit including the overdischarge inhibit circuit A to the external wire.

At the time of operation, the battery pack 16 is mounted in the switch box 17 so that the all of the internal circuits are electrically connected to each other and the circuits can be operated by the battery. If the battery pack 16 is removed from the switch box 17, discharge from the battery is only the self-discharge of the battery itself, and the lifetime of the battery can be increased.

Figure 10:
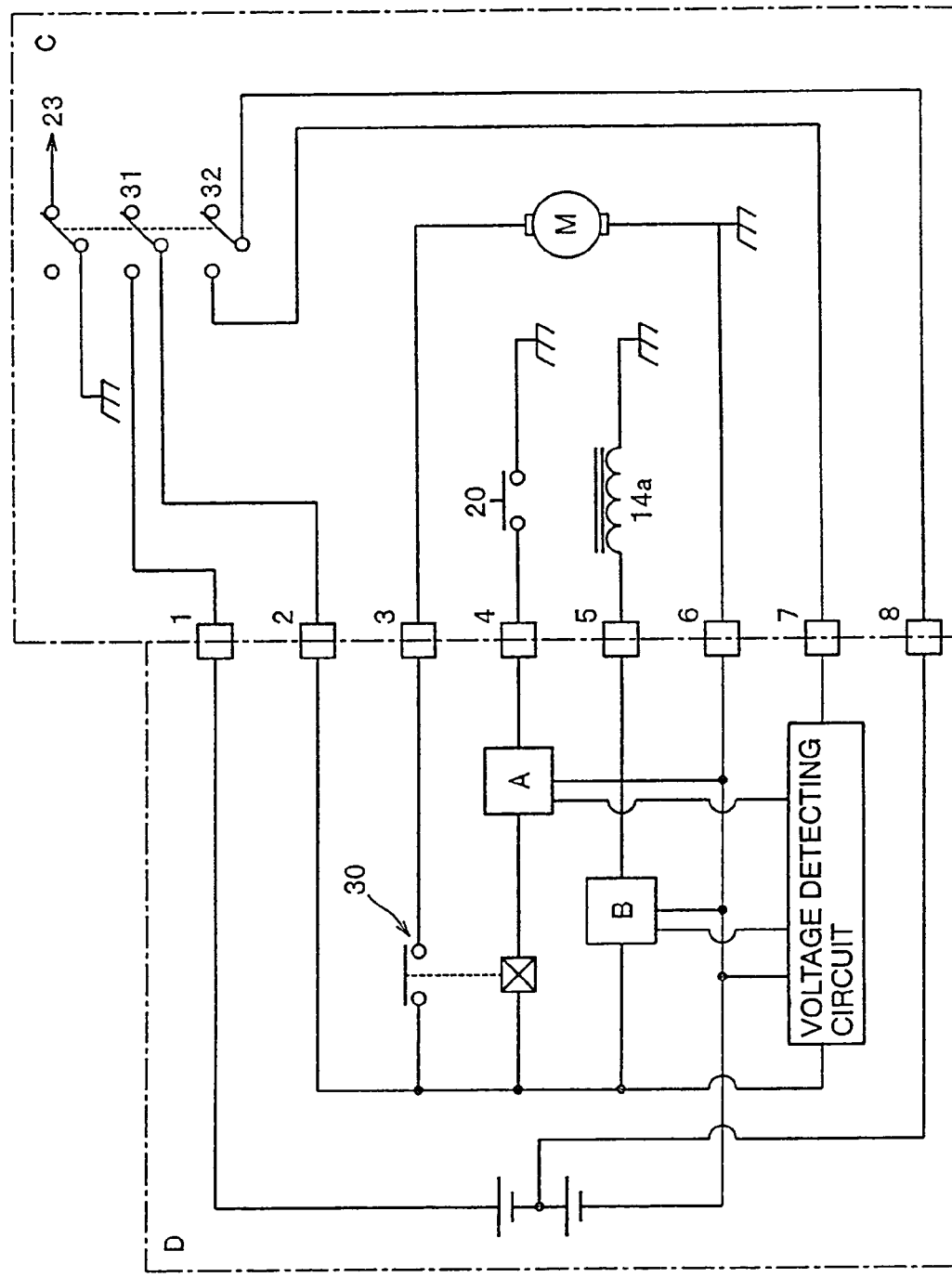
FIG. 10 is a view showing a shut-off mechanism of a modification.

FIG. 10 shows an example in which at the same time when an engine stop switch 23 is turned off no matter whether the engine is operating or not, all of the closed-circuits and opened-circuits incorporated in the battery pack 16 are shut down. That is, in the drawing, connection and opening can be done through four input and output terminals 1, 2, 7, 8 and the switches 31 and 32, and the switches 31 and 32 are formed so as to operate in association with the operation of the engine stop switch 23. When the engine stop switch 23 is ON, it is not connected to the spark plug 12, and the switches 31 and 32 between the starting switch 20 and the input and output terminals 1, 2, 7, 8 are also opened.

If the starting switch 20 and the engine stop switch 23 are closed in this state, the electric motor 131 is charged from the battery, and the engine 10 starts. At the same time, the battery and the spark plug 12 are connected to each other, and the engine 10 keeps rotating. Here, when it becomes necessary to stop the rotation of the engine, the engine stop switch 23 is turned OFF, a KILL terminal of the coil 12a of the ignition circuit is grounded to stop the engine. By the OFF operation of the engine stop switch 23, the two switches 31 and 32 disposed between the input and output terminals 1, 2, 7, 8 are disconnected. If the switches 31 and 32 are opened, all of the internal circuits of the battery pack 16 are shut down independently.

Figure 12:
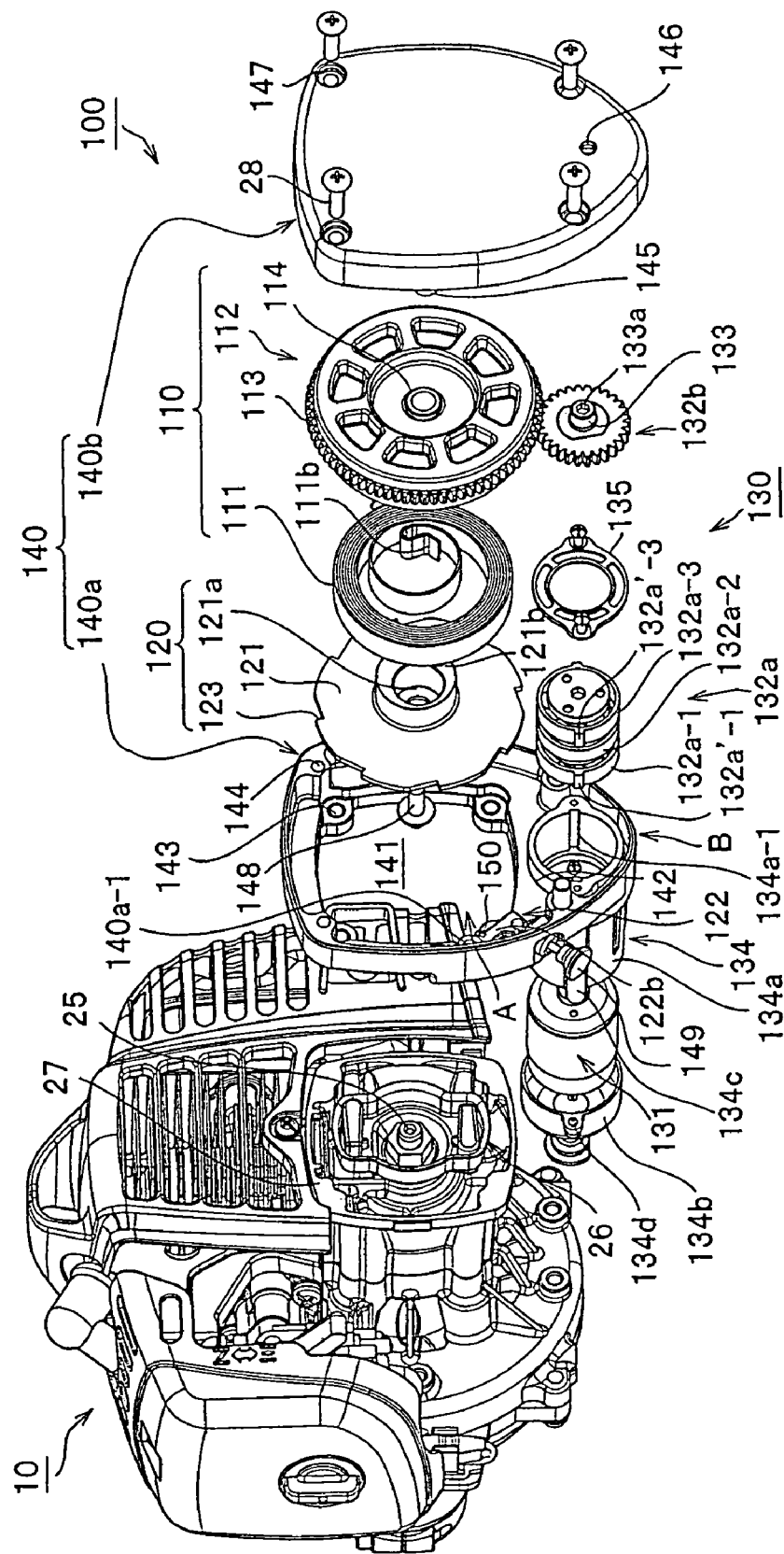
FIG. 12 is an assembly drawing of the compact engine starting device having the battery pack of the invention.

FIG. 12 shows an assembly of an engine starting device 100 and a compact engine 10 according to the embodiment of the invention having the connection circuit. FIGS. 12 to 15 are explanatory views showing disposition and configuration of the constituent devices of the engine starting device 100 of the embodiment. The engine starting device 100 of the embodiment is applied to a compact air-cooled gasoline engine and the like, and the engine starting device 100 is disposed near an input and output terminal of the crankshaft 25 of an internal combustion engine 10.

The engine starting device 100 includes a power accumulating portion 110, a power transmitting portion 120 and an electric driving portion 130. These power accumulating portion 110, the power transmitting portion 120 and the electric driving portion 130 are assembled as one unit and accommodated in a single case 140. The case 140 has an upper half square first space A for accommodating the power accumulating portion 110 and the power transmitting portion 120, and a lower half second space B for accommodating the driving portion 130. The second space B is of a reversed triangular shape whose width is gradually reduced toward its lower end. The case 140 is of a half-cut structure including an engine side and a side opposite of the engine, and includes first and second case bodies 140a and 140b.

The upper half of the first case body 140a on the side of the engine is a substantially square window portion 141, and a speed reducing mechanism fitting insertion hole 142 is formed in a central portion of its lower half. A later-described highly speed reducer mechanism 132 which is one of the constituent members of the electric driving portion 130 is fitted, inserted and supported in the speed reducing mechanism fitting insertion hole 142. Bolt insertion holes 143 are formed in four corners inside the square window portion 141 for fixing the first case body 140a to the engine 10. Screw holes 144 are formed in lower portions of upper two corners and lower two corners of the frame of the square window portion 141 for coupling the second case body 140b. A shaft 145 projects toward the engine from a central portion of a bottom inner wall surface forming the first space A of the second case body 140b on the opposite side of the engine. A wrench insertion hole 146 which is in communication with an internal space is formed at a portion of the back wall forming the second space B vertically below the shaft 145 corresponding to a center of the speed reducing mechanism fitting insertion hole 142. Bolt insertion holes 147 are also formed in the second case body 140b corresponding to the screw holes 144 of the first case body 140a.

Figure 13:
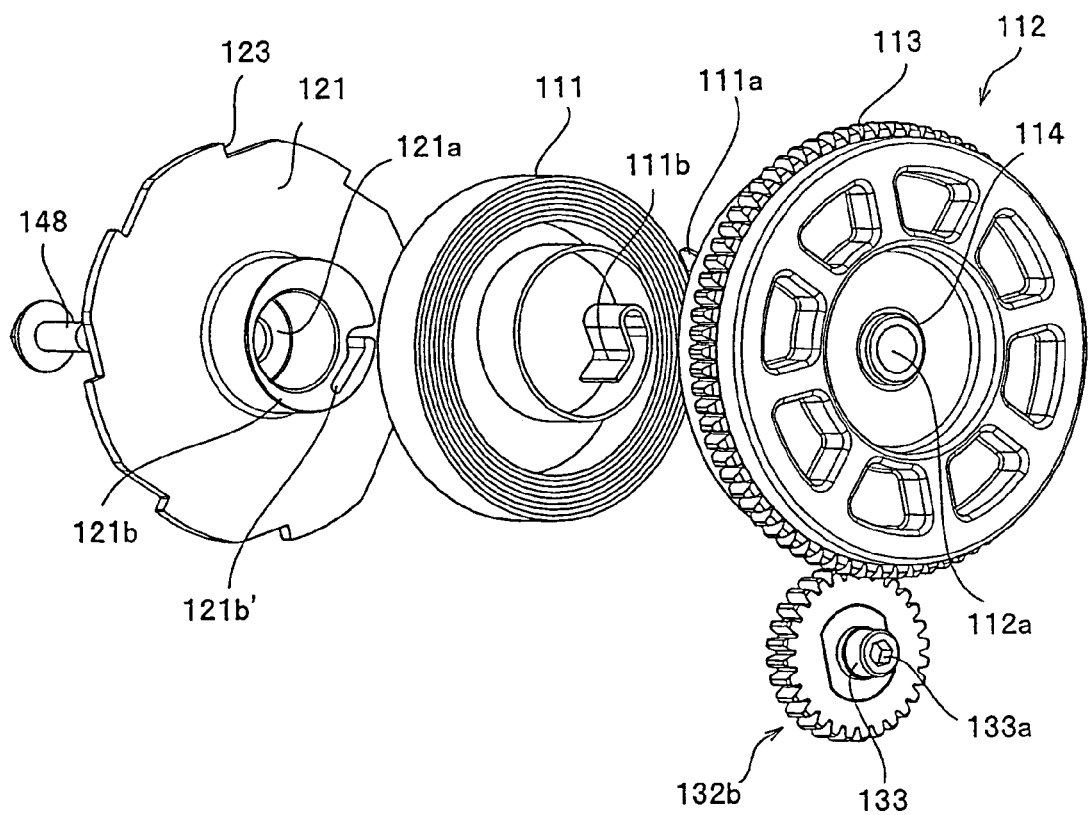
FIG. 13 is an enlarged exploded perspective view of a power accumulating portion, a power transmitting portion and a partial electric driving portion of the engine starting device.
Figure 14:
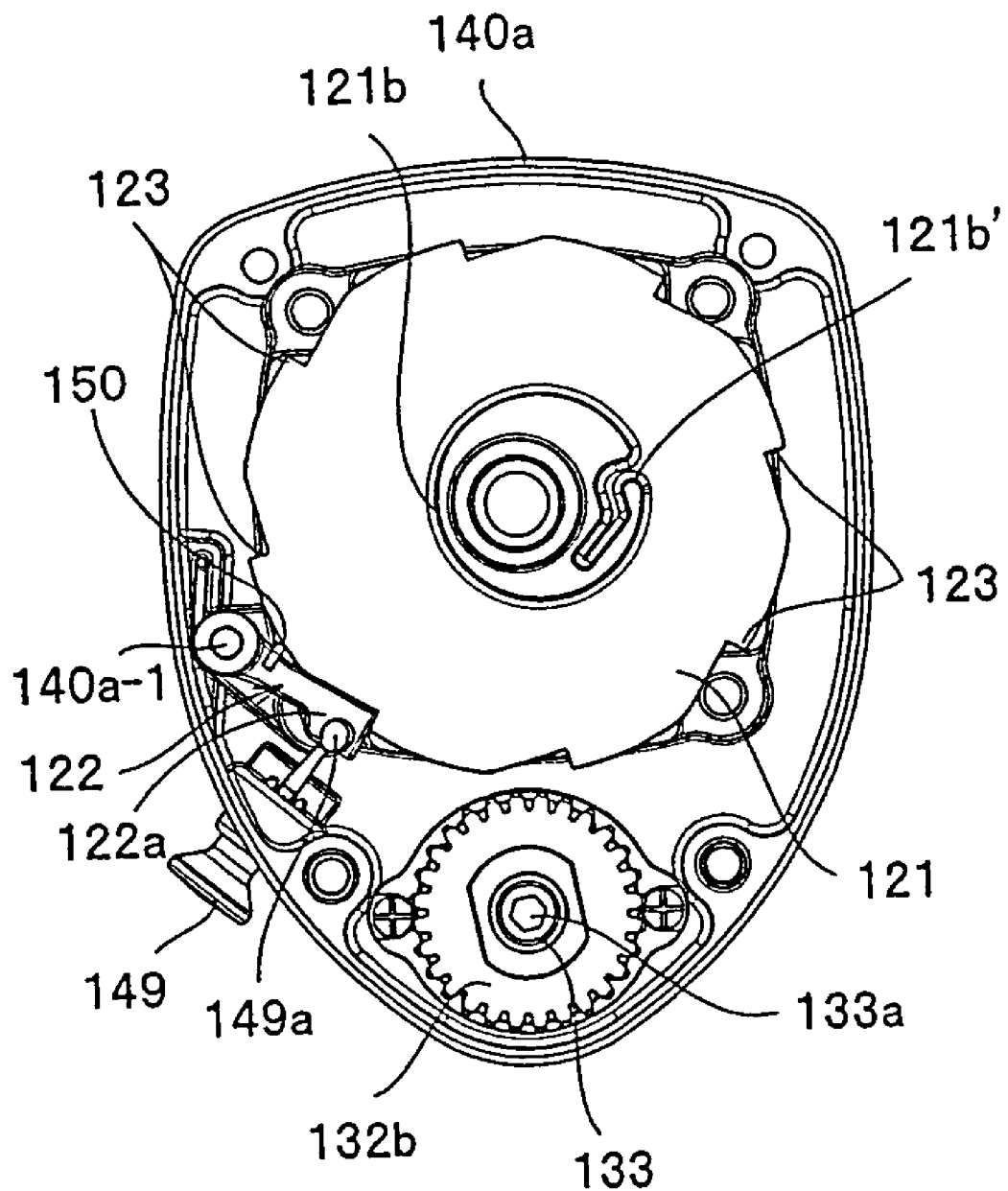
FIG. 14 is a front view of engaging and disengaging means when it is engaged with the power transmitting portion as viewed from behind.

As shown in FIGS. 12 and 13, the power accumulating portion 110 includes a spiral spring 111 and a spiral spring barrel 112. A spur gear 113, which is continuous in the circumferential direction, is formed on a half of an outer peripheral surface of the spiral spring barrel 112. A through hole 112a is formed in a central portion of the spiral spring barrel 112, an outer ring of a bearing-shaped one-way clutch 114 embedded into the through hole 112a, and the shaft 145 of the second case body 140b is press-fitted into the inner ring of the one-way clutch 114. A spiral spring accommodation space (not shown) is formed in the spiral spring barrel 112 on the side of the engine, and an outer end fixing groove (not shown) for engaging and fixing the outer end 111a of the spiral spring 111 is formed in a portion of a peripheral wall of the spiral spring accommodating space.

Figure 16:
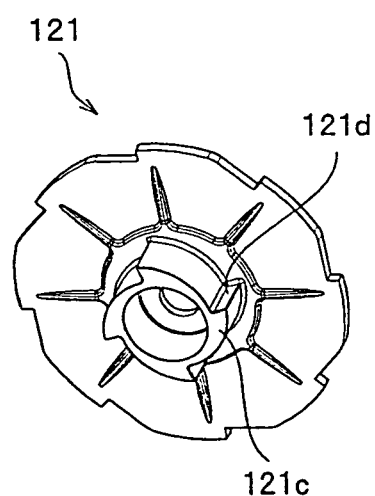
FIG. 16 is a perspective view of a driving wheel of the power transmitting portion as viewed from front.
Figure 17:
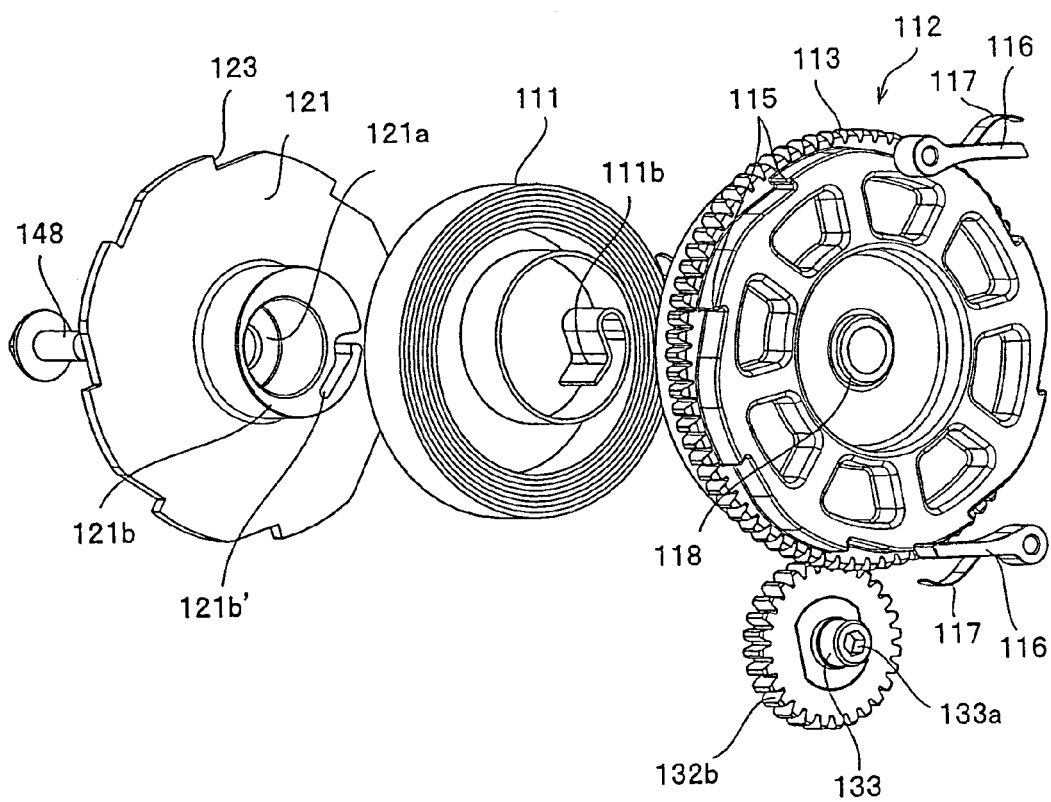
FIG. 17 is an enlarged exploded perspective view of a modification of the embodiment.

According to the embodiment, the spiral spring barrel 112 is allowed to rotate only in one direction by the bearing type one-way clutch 114. Alternatively, ratchet teeth 115 which are different from the spur gear 113 may be formed on the outer peripheral surface of the spiral spring barrel 112 instead of the one-way clutch 114 as shown in FIG. 16, and a ratchet pawl 116 which engages with the ratchet teeth 115 may rotatably supported by a portion of the second case body 140b. With this configuration, the spiral spring barrel 112 is also allowed to rotate only in one direction. The ratchet pawl 116 is biased in a direction engaging with the ratchet teeth 115 by the spring member 117 mounted on the second case body 140b. In this case, the spiral spring barrel 112 is rotatably supported by the shaft 145 through a normal plain bearing 118.

FIGS. 13 to 16 show a portion of FIG. 9 in an enlarged manner. As shown in FIGS. 13 to 16, the power transmitting portion 120 includes an actuation pulley 121 and an engaging and disengaging member 122 which is engaged with and disengaged from the actuation pulley 121. A loose insertion hole 121a is formed in a center of the actuation pulley 121. The shaft 145 projecting from the second case body 140b can loosely be inserted into the loose insertion hole 121a. As shown in FIG. 5, a spiral spring end fixing portion 121b is formed on a center of the actuation pulley 121 on the opposite side of the engine. The spiral spring end fixing portion 121b projects toward the spiral spring barrel 112 such as to surround the loose insertion hole 121a. The spiral spring end fixing portion 121b is formed with an inner end fixing groove 121b, which is engaged and fixed to the inner end 111b of the spiral spring 111. A screw hole (not shown) is formed in a tip end of the shaft 145. When the assembling is completed, a detent screw 148 is threadedly inserted into the screw hole, and the power accumulating portion 110 and the actuation pulley 121 are accommodated and fixed in the second case body 140b.

Figure 15:
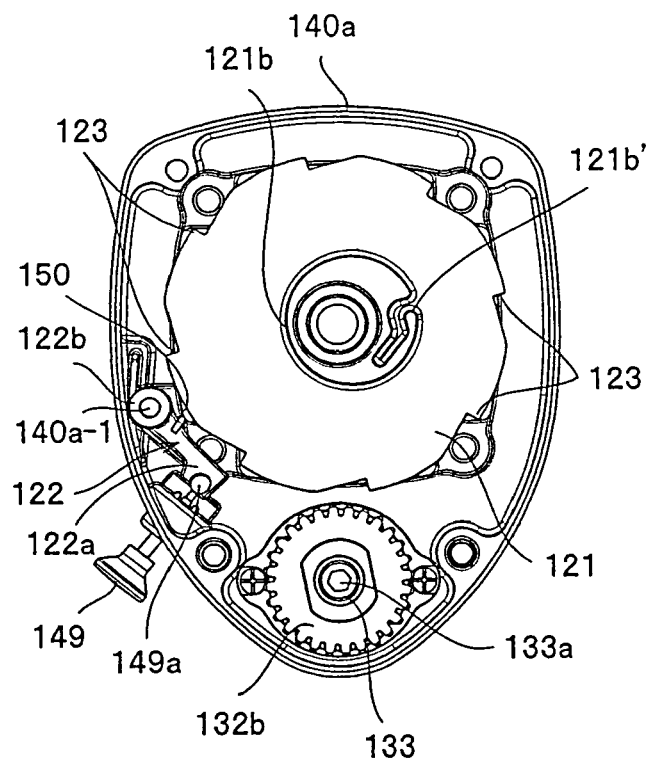
FIG. 15 is a front view of the engaging and disengaging means when it is not engaged with the power transmitting portion as viewed from behind.

An engaging projection 121c provided at its peripheral surface with ratchet teeth 121d as shown in FIG. 15 projects from a center portion of the actuation pulley 121 on the side of the engine. The engaging projection 121c engages with an engaging pawl 26, which is one element of the centrifugal clutch mechanism mounted on the crankshaft 25 of the engine 10. The engaging projection 121c engaged with the engaging pawl 26 mounted on the crankshaft 25 and stops while receiving energy in a releasing direction generated in a process in which the spiral spring barrel 112 rotates and the spring force is accumulated in the spiral spring 111 until the energy exceeds the maximum load of the engine, but if the force accumulated in the spiral spring 111 exceeds the maximum load, the engaging projection 121c starts rotating together with the engaged engaging pawl 26 to start the engine. If the engine rotation is brought into the steady state, the engagement between the engaging pawl 26 and the engaging projection 121c of the actuation pulley 121 is released by the centrifugal force, and the rotation of the engine is continued.

Ratchet teeth 123 are formed on the outer periphery of the actuation pulley 121 at predetermined distances from one another, and the entire actuation pulley 121 constitutes the ratchet wheel. One end 122b of the engaging and disengaging member 122 is rotatably supported by a boss 140a-1 of the first case body 140a, the tip end 122a is turned by a push button 149 and the tip end 122a is brought into engagement with and disengagement from the outer periphery ratchet teeth 123 of the actuation pulley 121 so as to allow or inhibit the rotation of the actuation pulley 121. The tip end 122a of the engaging and disengaging member 122 is biased by a torsion spring 150 in a direction where the tip end 122a is disengaged from the ratchet teeth 123 at the time of normal start of the engine, the one end 122b is rotated against the biasing force of the torsion spring 150, and the tip end 122a can be engaged with the ratchet teeth 123 for the first time. Here, the engaging and disengaging member 122 and the ratchet teeth 123 of the actuation pulley 121 correspond to rotation prohibiting inhibiting means of the present invention.

According to the embodiment, in order to rotate the tip end 122a of the engaging and disengaging member 122 against the biasing force, as shown in FIGS. 12 and 13, a ball portion 149a of a pin tip end of the push button 149 mounted on a portion of the peripheral wall of the first case body 140a is fitted into the tip end 122a of the engaging and disengaging member 122, and if the push button 149 is pushed, the engaging and disengaging member 122 is turned toward the ratchet teeth 123 against the biasing force of the torsion spring 150. By this pushing operation, the push button 149 is locked by locking means (not shown), and if the push button 149 is pulled toward the operator, the push button 149 is unlocked, and the engaging and disengaging member 122 is turned in a direction where the engagement with respect to the ratchet teeth 123 is released. The engaging and disengaging member 122 is fixed to the peripheral wall of the first case body 140a by the biasing force of the torsion spring 150.

The electric driving portion 130 includes the starting electric motor 131 and the highly speed reducer mechanism 132 coupled to the output shaft of the electric motor 131. The high speed rotation of the electric motor 131 is decelerated through the highly speed reducer mechanism 132, and transmitted to the spiral spring barrel 112. The highly speed reducer mechanism 132 includes a compact planet gear mechanism 132a and a spur gear 132b fixed to the output shaft of the planet gear mechanism 132a. Since a combination of the planet gear mechanism 132a and the spur gear 132b is employed as the speed reducing mechanism 132, its input portion and the output shaft can be disposed on the same axis, and the axis can be disposed in parallel to the shaft 145 which projects from the second case body 140b toward the engine. Further, in this embodiment, the axis of the electric driving portion 130 is disposed substantially vertically below the shaft 145. With this, the recoil mechanism is eliminated in the present invention, the battery which is conventionally disposed below the power accumulating portion 110 and the power transmitting portion 120 is disposed in the switch box 17 (see FIG. 3) mounted on the steering wheel (not shown) of a working machine for example outside of the case, the electric driving portion 130 is disposed in the vacant space, thereby shortening the length of the case 140 in the axial direction and shortening the lateral width of the case 140 to its minimum value.

The planet gear mechanism 132a of the embodiment includes first to third internal gears 132a-1 to 132a-3, which are ring-shaped sun gears. The planet gear mechanism 132a is accommodated and fixed in the motor drive accommodating case 134 together with the electric motor 131. That is, a plurality of projections 132a'-1 to 132a'-3 extending in parallel to the rotation shaft project from outer peripheral surface of the first to third internal gears 132a-1 to 132a-3, and the same number of fitting grooves 134a-1 extending in parallel to the axis are formed in the inner peripheral surface of the motor drive accommodating case 134 at corresponding positions of the projections 132a'-1 to 132a'-3. The projections 132a'-1 to 132a'-3 are fitted into the fitting grooves 134a-1.

In the embodiment, the motor drive accommodating case 134 includes a bottomed cylindrical body, and a side thereof opposite of the engine is opened. The motor drive accommodating case 134 is divided into a cylindrical body 134a and a bottom portion 134b. Projections 134c and 134d extending in parallel to the axis project from both portions of the outer periphery formed with the fitting grooves 134a-1 of the cylindrical body 134a and the bottom portion 134b, the projection 134d of the bottom portion 134b is formed with a screw hole, and a bolt insertion hole is formed in the projection 134c of the cylindrical body 134a. The projections 132a'-1 and 132a'-3 of the planet gear mechanism 132a are fitted into the fitting groove 134a of the motor drive accommodating case 134, and the electric motor 131 and the planet gear mechanism 132a are accommodated and fixed therein. The motor drive accommodating case 134 accommodating the electric motor 131 and the planet gear mechanism 132a is embedded and supported in the motor drive embedding hole 142 formed in the first case body 140a. The electric motor 131 and the planet gear mechanism 132a accommodated in the motor drive accommodating case 134 are fastened and fixed through a bolt and a nut (not shown) by a fixing frame 135 such that the output shaft of the planet gear mechanism 132a is exposed outside. In this manner, the spur gear 132a is fixed to the tip end of the output shaft of the planet gear mechanism 132a, which is accommodated and fixed in the motor drive accommodating case 134.

According to the embodiment, the speed reduction ratio between the compact electric motor 131 and the spiral spring barrel 112 is set to 1/50. The speed reduction ratio between the spur gear 132b fixed to the output shaft of the planet gear mechanism 132a and the spur gear 113 formed on the outer periphery of the spiral spring barrel 112 is set to 1/2.5. Therefore, the speed reduction ratio of the planet gear mechanism 132a is set to 1/20. An engaging portion 133a which can be engaged with a hexagonal wrench (not shown) is formed on the output shaft 133 of the planet gear mechanism 132a, i.e., a support shaft end of the spur gear 132b, and the center of a wrench insertion hole 146 formed in a back wall of the second case body 140b is located on the axis.

In order to accommodate the constituent members of the embodiment having the above-described configuration into the case 140, the shaft 145 of the second case body 140a is press-fitted into the through hole 112a of the spiral spring barrel 112 into which the one-way clutch 114 is embedded. At that time, the outer end of the spiral spring 111 is engaged with and fixed to the outer end fixing groove (not shown) formed in the peripheral wall of the spiral spring accommodating space of the spiral spring barrel 112. Next, the inner end of the spiral spring 111 is engaged and fixed to the inner end fixing groove 121b of the spiral spring end fixing portion 121b formed in the center of the actuation pulley 121. Then, the shaft 145 of the second case body 140b is loosely inserted into the loose insertion hole 121a through which the spiral spring end fixing portion 121b passes and then, a detent screw 147 is threadedly inserted into the screw hole formed in the tip end of the shaft 145, and the accommodation and assembling of the spiral spring barrel 1 and the actuation pulley 121 into the second case body 140b are completed.

When the electric driving portion 130 is assembled into the case 140, the DC electric motor 131, the planet gear mechanism 132a and the spur gear 132b of the speed reducing mechanism 132 are previously assembled into an assembly. The projections 132a'-1 and 132a'-3 formed on the outer peripheral surface of the planet gear mechanism 132a of this assembly are fitted, fixed and supported in the inner surface fitting groove 142a of the speed reducing mechanism fitting insertion hole 142 formed in the first case body 140a. Thereafter, it is fastened to the crankshaft 29 by means of bolts 28 through four bolt insertion holes 143 formed in the four corners of the square window portion 141 of the first case body 140a. At the same time, the electric motor 131 is positioned and fixed to a predetermined position of the crankshaft 29.

The first case body 140a is fixed to a crankcase 29 together with the electric driving portion 130 and then, a bolt 28 is threadedly inserted into a screw hole 144 of the first case body 140a through a screw insertion hole 147, and the second case body 140b to which the power accumulating portion 110 and the power transmitting portion 120 are assembled is integrally fixed to the first case body 140a. When the second case body 140b is fixed to the first case body 140a, a other rotation end 122c of the engaging and disengaging member 122 is engaged with an outer periphery ratchet teeth 123 of the actuation pulley 121. When the engaging and disengaging member 122 is pivotally supported by the boss 140a-1, the tip end 122c is biased in a direction where it is not engaged with the ratchet teeth 123 by the torsion spring 150 unless the end 122b of the engaging and disengaging member 122 is operated.

According to the electric engine starting device 100 of the embodiment having the above-described configuration, in the case 140, the conventional recoil type driving portion and battery are eliminated, the spiral spring barrel 112 accommodating the spiral spring 111 of the power accumulating portion 110 and the actuation pulley 121 of the power transmitting portion 120 are supported on the same shaft 145, and the shaft 145, the planet gear mechanism 132a and the spur gear 132b which constitute the electric motor 131 and the speed reducing mechanism 132 which are electric driving portion 130 are merely disposed vertically below the shaft 145. Since the ultra-compact electric motor 131 and the ultra-compact planet gear mechanism 132a are also used, they can be accommodated in the case 140 extremely compactly. As a result, the case 140 itself, i.e., the entire starting device is extremely reduced in size.

To start the engine 10 by the starting device 100, if the starting electric motor 131 provided on the steering wheel is turned ON for example, the electric motor 131 is actuated, the spiral spring barrel 112 is rotated in the power accumulating direction of the spiral spring 111 at the speed reduction ratio of 1/50 by the highly speed reducer mechanism 132 including the planet gear mechanism 132a and the spur gear 132b. At that time, the engaging and disengaging member 122 is not engaged with the actuation pulley 121 of the power transmitting portion 120, and the engaging pawl 26 mounted on the crankshaft 25 is merely engaged with the engaging projection 121c of the actuation pulley 121.

In a process where the spiral spring barrel 112 is rotated and force is accumulated in the spiral spring 111, a force for releasing the accumulated force acts on the spiral spring 111, and procedure is proceeded to a step for rotating the crankshaft 25 through the engaging pawl 26 and compressing the engine 10. However, the crankshaft 25 cannot be further rotated until sufficient force for exceeding the maximum load in the compressing stroke is accumulated in the spiral spring 111. If the force exceeding the maximum load in the compression stroke of the engine 10 is accumulated in the spiral spring 111, a force of the spiral spring 111 in the direction releasing the accumulated force becomes greater, the actuation pulley 121 turns the crankshaft 25 through the engaging pawl 26 to ignite the engine 10, and the operation thereof is started. It takes only 1 to 5 seconds until the engine 10 is started after the electric motor 131 is actuated. In this embodiment, if the discharging time to the electric motor for starting the engine 10 exceeds 10 seconds, the overdischarge inhibit circuit A which is one of protection circuits in the battery pack 16 is operated, and the discharge from the battery is shut down. If the rotation of the engine 10 is brought into the steady state, the engagement between the engaging pawl 26 and the engaging projection 121c of the actuation pulley 121 is released, and the rotation of the engine is continued. The time required for starting the engine 10 at that time is very short because the speed reduction ratio of the speed reducing mechanism is relatively small as short as 1/50 together with the battery of the present invention, and the time is almost the same as starting time by a normal self-starter in an automobile.

As is apparent from the above explanation, according to the electric engine starting device of the present invention, since the lithium-based secondary battery is employed as the battery, the battery can be reduced in size and weight although the reliability of the quality and output are high. Further, the battery pack in which the battery is incorporated is not accommodated in the case of the engine starting device, and can be disposed in the switch box mounted on the steering wheel of the working machine. The ultra-compact electric motor and highly speed reducer mechanism are employed, and the recoil type drive mechanism is eliminated from the starting device and thus, the starting device itself can extremely be reduced in size. In the present invention, protection circuits such as the overdischarge inhibit circuit, the overheat preventing circuit, and the relay circuit connected to the overdischarge inhibit circuit are disposed in the electric motor driving circuit incorporated in the battery pack. Thus, the internal circuits and the electric motor in the battery pack are not burned out. Since the overcharge preventing circuit B is disposed in the battery pack, the battery can be charged utilizing the rotation of the engine. If the carburetor having the automatic choke is provided, the engine can always be started smoothly even in a cold place. The constituent members of the engine starting device are disposed rationally to the utmost, and the engine starting device is further reduced in size. Further, when the electric motor cannot be driven, the engine can be safely started easily by manual operation like the conventional electric engine starting device.

What is claimed is:

1. A battery pack for driving a compact electric motor of a compact engine starting device mounted on a working machine comprising a compact electric motor, a power accumulating portion in which power of the compact electric motor is transmitted in a power accumulating direction through a highly speed reducer mechanism, and a power transmitting portion for transmitting accumulated force of the power accumulating portion to a crankshaft of an engine, wherein the battery pack is provided therein with a lithium-based secondary battery comprising at least two cells, a normal protection circuit comprising a self-discharge preventing circuit and an overcurrent preventing circuit, and further provided with a protection circuit comprising an electronic circuit comprising at least an overcharge preventing circuit (B), an overdischarge inhibit circuit (A) and a start switch relay circuit, which are connected to the lithium-based secondary battery, wherein a total discharging amount of the lithium-based secondary battery in the battery pack is 500 to 2000 mAh, and charging voltage per one cell is 3.0 to 4.2 V, and wherein a maximum discharge current of the lithium-based secondary battery in the battery pack is set to 10 to 60 A, and discharge is automatically stopped when a predetermined continuous discharge time set in accordance with set maximum discharge current elapsed.

2. The battery pack according to claim 1, wherein the overdischarge inhibit circuit (A) is a time circuit, and a continuous discharge time required for driving the engine starting electric motor is set such that the continuous discharge time is automatically stopped when 5 to 15 seconds elapsed.

3. The battery pack according to claim 1, wherein the battery pack has a volume of $2.5 \times 10^4$ to $1.0 \times 10^5 \, mm^3$.

4. The battery pack according to claim 1, wherein the overcharge preventing circuit (B) cuts a charge when a charging voltage per one cell exceeds 4.0 to 4.4 V.

5. The battery pack according to claim 1, the battery pack further comprising an overheat preventing circuit in which the protection circuit detects internal temperature of the battery pack, and at a time when a rise of the detected temperature reaches a predetermined temperature irrespective of a set discharge time region of the overdischarge inhibit circuit (A), an electronic switch is automatically opened.

6. The engine starting device of the compact engine mounted on a manual working machine wherein the engine starting device is provided therein with the compact electric motor driven by the lithium-based secondary battery of the battery pack according to claim 1, the power accumulating portion in which the power of the compact electric motor is transmitted in the power accumulating direction through the highly speed reducer mechanism, and the power transmitting portion for transmitting the accumulated force of the power accumulating portion to the crankshaft of the engine.

7. The engine starting device according to claim 6, wherein the battery pack is integrally disposed in a switch box of a steering of the manual working machine.

8. The engine starting device according to claim 6, wherein the compact electric motor has a housing volume of $4.0 \times 10^3$ to $8.0 \times 10^4$ mm$^3$, breakdown current of 1 to 100 A, and breakdown torque of 10 to 500 mNm.

9. The engine starting device according to claim 6, the starting device further comprising a carburetor having an automatic choke operated by a solenoid valve which is driven by the lithium-based secondary battery, and drive current of the solenoid valve is 200 to 800 mA.

10. The manual working machine having the engine starting device according to claim 6.

11. The manual working machine according to claim 10, wherein the engine comprises a power generator for charging the lithium secondary battery, the power generator comprises a magnet disposed on a rotation portion of the engine, and a power generating coil disposed on an opposed portion of the magnet.

12. The manual working machine according to claim 11, wherein the rotation portion of the engine is a fan fixed to the crankshaft.

* * * * *